United States Patent [19]
Takayama et al.

[11] Patent Number: 6,005,741
[45] Date of Patent: *Dec. 21, 1999

[54] REPRODUCING APPARATUS USING PILOT SIGNAL CROSSTALK FOR TRACKING CONTROL AND USING PILOT SIGNALS TO ELIMINATE A BACK LOCK CONDITION

[75] Inventors: Nobutoshi Takayama, Yokohama; Shuya Tanaka, Kawasaki, both of Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/749,622

[22] Filed: Nov. 18, 1996

Related U.S. Application Data

[63] Continuation of application No. 08/247,675, May 23, 1994, abandoned.

[30] Foreign Application Priority Data

| May 28, 1993 | [JP] | Japan | 5-151437 |
| Jun. 1, 1993 | [JP] | Japan | 5-154361 |
| Jun. 11, 1993 | [JP] | Japan | 5-166319 |

[51] Int. Cl.$^6$ .................................................. G11B 5/584
[52] U.S. Cl. ................................. 360/77.14; 360/77.13; 360/77.15
[58] Field of Search ........................... 360/77.13, 77.14, 360/77.15, 70, 78.02

[56] References Cited

U.S. PATENT DOCUMENTS

| 4,597,023 | 6/1986 | Rijckaert | 360/77.14 |
| 5,003,413 | 3/1991 | Miyazaki | 360/77.14 |
| 5,003,414 | 3/1991 | Yokozawa | 360/77.14 |
| 5,095,394 | 3/1992 | Yanagihara | 360/77.14 |
| 5,142,421 | 8/1992 | Kahlman et al. | 360/40 |
| 5,146,373 | 9/1992 | Wakui et al. | 360/77.14 |
| 5,301,070 | 4/1994 | Tanaka | 360/64 |
| 5,402,281 | 3/1995 | Yanagihara et al. | 360/77.14 |
| 5,469,304 | 11/1995 | Sakakibara et al. | 360/77.14 X |
| 5,490,017 | 2/1996 | Nakamura et al. | 360/77.14 X |
| 5,546,248 | 8/1996 | Sakakibara et al. | 360/77.14 |

FOREIGN PATENT DOCUMENTS

| 4-255969 | 10/1992 | Japan | G11B 20/14 |

Primary Examiner—Aristotelis M. Psitos
Assistant Examiner—K. Wong
Attorney, Agent, or Firm—Fitzpatrick, Cella, Harper & Scinto

[57] ABSTRACT

An information signal reproducing apparatus for reproducing information signals from a recording medium in which a pilot signal component having a predetermined frequency is superimposed on the information signals at every other track of a plurality of parallel tracks. A tracking error signal is formed from pilot signal crosstalk from tracks in which the pilot signal component is not superimposed. The tracking error signal is modified using the signal on which the pilot signal component is superimposed. To facilitate such a modification, no pilot signal is superimposed in a second area of the track in which the pilot signal component is superimposed in a first area thereof, and the pilot signal is superimposed in the second area of the track in which no pilot signal component is superimposed in the first area thereof.

8 Claims, 24 Drawing Sheets

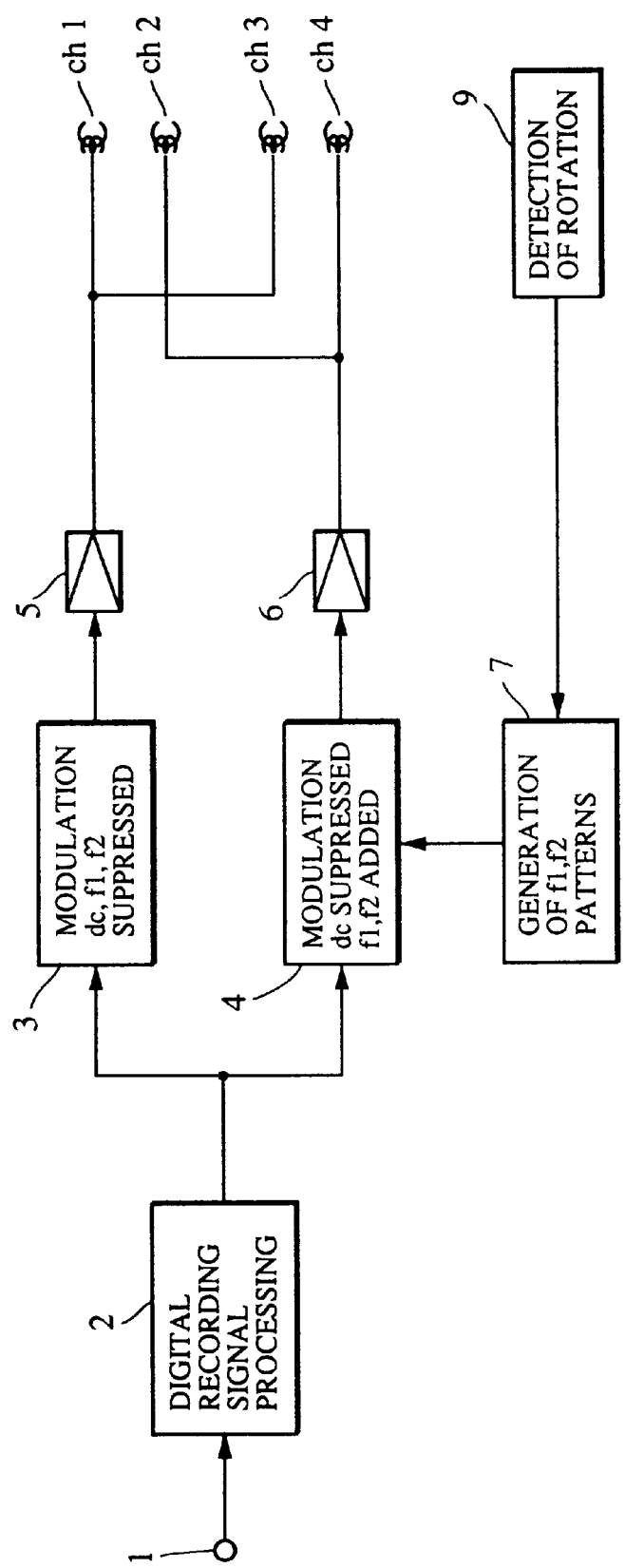

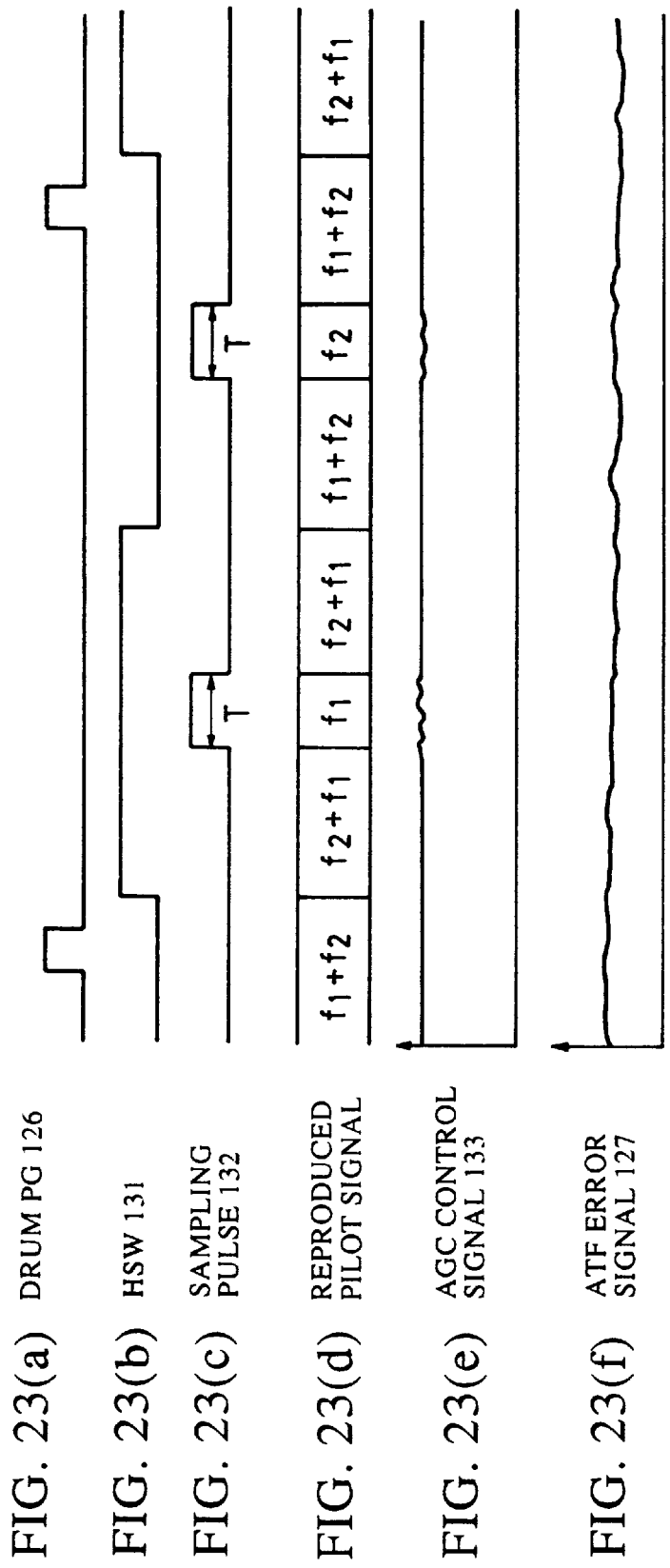

REPRODUCING APPARATUS USING PILOT SIGNAL CROSSTALK FOR TRACKING CONTROL AND USING PILOT SIGNALS TO ELIMINATE A BACK LOCK CONDITION

This application is a continuation of application Ser. No. 08/247,675, filed May, 23, 1994, now abandoned.

BACKGROUND OF THE INVENTION

1. Field of the Invention

The present invention relates to an information signal recording apparatus and an information signal reproducing apparatus for recording information signals on or reproducing information signals from a recording medium in which a number of tracks are formed in parallel to each other. Particularly, the present invention pertains to tracking control for such an apparatus. Concretely, the present invention relates to tracking control employed in, for example, a VTR for reproducing video signals from slant tracks formed on a magnetic tape by means of a rotary head.

2. Description of the Related Art

Reproduction tracking methods for VTRs for household use have been proposed and put into practical use. An example of such s reproduction tracking method is the method (CTL method) in which a vertical synchronizing signal separated from a recording signal during recording is recorded in a dedicated control track formed in a longitudinal direction of a tape by means of a fixed magnetic head provided at part of a tape path. Another example of such a method is the method (4fATF method) in which recording pilot signals having four types of relatively low frequencies are recorded in turn on tracks on which main signals, such as video signals and audio signals, are to be recorded in such a manner that the pilot signals are superimposed on the main signals by means of a rotary head for recording and reproducing main signals and in which a tracking error signal (ATF error signal) is obtained by comparing the crosstalk components reproduced from the tracks adjoining the reproduction track during reproduction.

However, the CTL method requires a space for installing the fixed head, and is disadvantageous in terms of the size of the apparatus. The 4fATF method is advantageous in terms of reducing the size of the apparatus but has disadvantages in that the circuit configuration is relatively complicated because 4 types of pilot signals are required and because many analog circuit elements are thus required, and in that digital signals become less reliable when the pilot signals are superimposed thereon.

Recently, there has been a trend toward developing digital VTRs for household use exhibiting an increased image quality. Such VTRs require recording and reproduction of a relatively large amount of information. Therefore, it has been proposed to divide and record an image signal of a single field over a plurality of tracks, and a new tracking method employed in such a VTR has been examined. In this new tracking method, when a digital signal to be recorded is modulated, a recording signal is recorded in such a manner that a frequency component corresponding to a particular pilot signal is contained in a modulated signal, whereby a tracking controlling pilot signal is superimposed on a digital information signal.

Concretely, it has been proposed to superimpose the pilot signals in the manner shown in FIG. 1. In FIG. 1, reference numeral 41 denotes a magnetic tape. FIG. 1 illustrates a recording pattern on the tape 41. In this example, two types of pilot signals having frequencies f1 and f2 are used to obtain a tracking error signal. These pilot signals are superimposed on the main signals at every other track in the manner shown in FIG. 1. The pilot signals are recorded in a regular order: no pilot signal is superimposed in tracks whose head azimuth is (+), and f1 and f2 are alternately superimposed in tracks whose head azimuth is (−). In the recording pattern shown in FIG. 1, a signal of a single frame is divided and recorded in 10 tracks, and (1) through (10) denote track Nos. which record that signal of the single frame.

What reference numerals ch1, ch2, ch3, ch4 and $ch1_1$, $ch1_2$, $ch1_3$, $ch1_4$ in FIG. 1 refer to will be described later in the Detailed Description of the Preferred Embodiments.

However, the above-described new tracking method produces a tracking error signal (ATF error signal) shown in FIG. 2, and thus has the following problems.

Firstly, in addition to the normal tracking error locked position A where the level of the ATF signal becomes zero, the heads correctly trace desired tracks and desired information signals are reproduced by predetermined respective heads at an expected timing, there are positions D and E where the level of the ATF signal also becomes zero, the heads trace undesired tracks.

As is generally known, tracking control cannot quickly work nearby these positions. Such condition is called pseudo-stable condition. Therefore, it takes a long time for tracking control to make heads track the desired tracks. Such positions are called back locked positions.

In the tracking control, when the ATF error signal is plus, the tape is moved in a direction indicated by an arrow B. Consequently, when the ATF error signal is plus at position D, the tape is moved two tracks in the direction indicated by the arrow B so that it is locked at position A. When the ATF error signal is minus, similar control is performed in the direction indicated by an arrow C. However, since the tape is moved by an amount corresponding to the magnitude of the ATF error signal, it takes time for the track at position A to be moved, during which time the screen may be disturbed.

Secondly, the reproduction output level may vary due to a difference between the reproduction level of f1 and that of f2 (a difference in the reproduction level due to the reproduction frequency characteristics) or due to the performance of the tape used, thus varying the servo characteristics of the tracking control loop. In addition, the flutter of a capstan easily occurs at a cycle in which four tracks are reproduced, because the level of the reproduced pilot signals is varied at the cycle mentioned above. In the conventional 4fATF method, these problems are solved by performing automatic gain control (AGC) of a reproduced pilot signal by detecting the level of the pilot signal reproduced from a track from which the main signals are being reproduced. However, in the above-described new tracking method, since no pilot signal is recorded on a track from which the main signals are being reproduced by a head which is reproducing the main signals, the same structure as that obtained in 4fATF cannot be accomplished.

Thirdly, in the tracking control performed only by using the adjacent crosstalk obtained from a certain head, when a relative deviation in the mounting position of the respective heads is generated during the assembly of a rotary drum, the output level of the signal reproduced from the other head is reduced. Conventionally, this is overcome by improving the mounting accuracy. However, this increases production costs.

SUMMARY OF THE INVENTION

A primary object of the present invention is to provide an information signal recording apparatus and an information signal reproducing apparatus which can overcome the above-described problems.

Another object of the present invention is to provide an information signal reproducing apparatus which can shorten the time during which tracking is out of control even when information signals are reproduced from a recording medium on which recording is performed in a method in which tracks on which a pilot signal is superimposed and tracks on which no pilot signal is superimposed exist in a mixed state.

Still another object of the present invention is to provide an information signal reproducing apparatus which can prevent deterioration in the tracking control caused by variations in the output level of a reproduced pilot signal even when information signals are reproduced from a recording medium on which recording is performed in a method in which tracks on which a pilot signal is superimposed and tracks on which no pilot signal is superimposed exist in a mixed state.

Still another object of the present invention is to provide an information signal reproducing apparatus which can obtain excellent reproduced signals from any track even when information signals are reproduced from a recording medium on which recording is performed in a method in which tracks on which a pilot signal is superimposed and tracks on which no pilot signal is superimposed exist in a mixed state.

To achieve the above objects, the present invention provides in one aspect thereof an information signal reproducing apparatus for reproducing information signals from a recording medium in which pilot signal components having at least one type of predetermined frequency are superimposed on the information signals in a large number of parallel tracks at every other track, which comprises head means for tracking the recording medium to reproduce the signals, the head means including a plurality of heads, formation means for forming a tracking error signal according to the pilot signal components in the signal reproduced by mainly tracking, by means of the head means, the track in which the pilot signal component is not superimposed, and modification means for modifying the tracking error signal using the signal reproduced by mainly tracking, by means of the head means, the track in which the pilot signal component is superimposed.

Still another object of the present invention is to provide an improved information signal recording apparatus which can superimpose pilot signals in such a manner that stable and improved tracking control can be assured during reproduction.

To achieve the above object, the present invention provides in another aspect thereof an information signal recording apparatus which comprises superimposition means for superimposing a pilot signal component on an information signal, head means for recording the information signals on a recording medium while forming a large number of parallel tracks on the recording medium, each of the large number of tracks having first and second areas, the first areas of the respective tracks being located adjacent to each other while the second areas of the respective tracks being located adjacent to each other, and control means for controlling whether or not the pilot signal component is superimposed on the information signal in the superimposition means, the control means operating such that the pilot signal components are superimposed on the information signals in the large number of parallel tracks at every other track in such a manner that no pilot signal is superimposed in the second area of the track in which the pilot signal component is superimposed in the first area thereof while the pilot signal is superimposed in the second area of the track in which no pilot signal component is superimposed in the first area thereof.

According to another aspect of the present invention, an information signal reproducing apparatus for reproducing information signals from a recording medium in which at least one pilot signal component having a predetermined frequency is superimposed on the information signals at every other track of a plurality of parallel tracks includes head means for tracing said recording medium to reproduce the information and the pilot signals, the head means including first and second heads. Formation means are provided for forming a tracking error signal from at least one of the pilot signal components reproduced by the first head. Modification means are provided for modifying the tracking error signal using a signal reproduced by the second head.

According to a further aspect of the present invention, an information signal reproducing apparatus for reproducing information signals from a recording medium in which a pilot signal component having a predetermined frequency is superimposed on the information signals at every other track of a plurality of parallel tracks includes head means for tracking said recording medium to reproduce the information and the pilot signals, the head means including first and second heads. Formation means are provided for forming a tracking error signal from at least one of the pilot signal components reproduced by either the first and second heads. Modification means are provided for modifying the tracking error signal using a signal reproduced by either said first or said second head. Switching means are provided for switching connections between the head means, the formation means, and the modification means. The switching means causing the modification means to modify the tracking error signal using a signal reproduced by the second head when the formation means forms the tacking error signal according to the pilot signal component in the signal reproduced by the first head. The switching means causes the modification means to modify the tracking error signal using a signal reproduced by said first head when said formation means forms the tacking error signal according to the pilot signal components in the signal reproduced by the second head.

According to yet a further aspect of the present invention, an information signal reproducing apparatus for reproducing information signals from a recording medium in which one of first or second pilot signal components respectively having first or second frequencies is superimposed on said information signals at every other track in a plurality of parallel tracks includes head means for tracking said recording medium to reproduce the information and the pilot signals. First and second separation means are provided for respectively separating the first and second frequency components from the signal reproduced by said head means. Formation means are provided for forming a tracking error signal using the outputs of said first and second separation means. Modification means are provided for modifying said tracking error signal using the outputs of the first and second separation means.

According to another aspect of the present invention, an information signal recording apparatus includes first superimposition means for superimposing a first pilot signal component on an information signal. Second superimposition means are provided for superimposing a second pilot signal component, which is different from the first pilot signal component, on the information signal. Head means are provided for recording said information signal on a recording medium in a plurality of parallel tracks. The head means includes a first head, a second head located adjacent to said first head to track a track adjacent to the track said first head traces, a third head for tracking a track located adjacent to the track said second head traces, and a fourth head for tracking a track located adjacent to the track said third head traces. Connection means are provided for connecting the first superimposition means to the first and fourth heads, and for connecting the second superimposition means to the second and third heads.

Other objects and advantages of the invention will become apparent during the following description taken in connection with the accompanying drawings.

BRIEF DESCRIPTION OF THE DRAWINGS

FIG. 4 schematically illustrates the structure of a recording system for a digital VTR for executing the tracking control according to the present invention;

FIG. 23(a)–(f) are timing charts of signals used in the reproducing circuit shown in FIG. 22 in the normal reproduction mode.

DETAILED DESCRIPTION OF THE PREFERRED EMBODIMENTS

Embodiments of the present invention will be described with reference to the accompanying drawings.

Figure 3A:
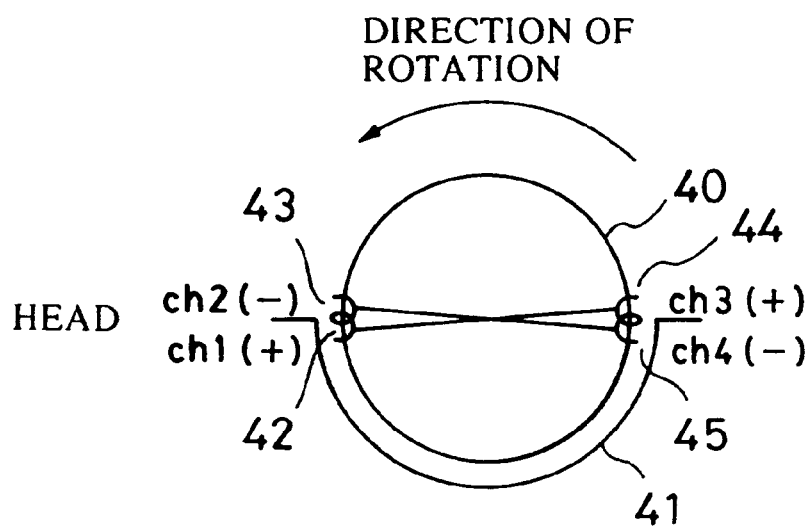
FIG. 3(a) is a schematic plan view illustrating the structure of the vicinity of a drum for a VTR used in embodiments of the present invention.

FIG. 3(a) is a schematic plan view of a drum portion of a VTR employed in each of the embodiments of the present invention. Reference numeral 40 denotes a rotary drum. Reference numeral 41 denotes a tape. Reference numeral 42 denotes a ch1 head of + azimuth. Reference numeral 43 denotes a ch2 head of − azimuth. Reference numeral 44 denotes a ch3 head of + azimuth. Reference numeral 45 denotes a ch4 head of − azimuth.

Figure 3B:
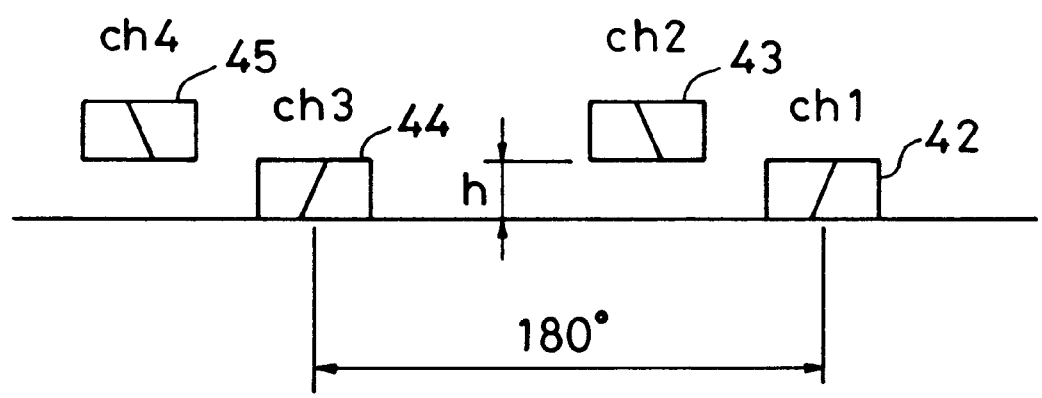
FIG. 3(b) illustrates the height at which each of the heads shown in FIG. 3(a) is mounted.

FIG. 3(b) is a radial of the heads illustrating the height at which the respective heads 42 through 45 are mounted. The heads ch1 and ch2 and the heads ch3 and ch4 are disposed close to each other in pairs. The pairs are disposed at 180° opposite positions of the drum. As can be seen from FIG. 3(b), the heads ch2 and ch4 are offset from the heads ch1 and ch3 in an upward direction by a distance h corresponding to a single track pitch on the tape. This structure enables recording or reproduction to be conducted on two tracks at the same time each time the drum makes half a rotation.

FIG. 4 schematically illustrates a recording system for a digital VTR which carries out tracking control according to the present invention.

In FIG. 4, reference numeral 1 denotes an input terminal in which digital signals, including video signals, and audio signals, which are main signals, are input. Reference numeral 2 denotes a digital recording signal processing device for coding the digital signal input from the input terminal and for adding various data, such as an ID code, a synchronizing code and an error detection/correction code, to the digital signal. In this embodiment, 24-bit data, which is three 8-bit data, are output in parallel from the digital recording signal processing device 2.

The 24-bit data is supplied to both modulating circuits 3 and 4. The modulating circuits 3 and 4 convert the 24-bit data into 25-bit data having a different bit pattern in which the amounts of components having predetermined frequencies f1 and f2 and the amount of the dc component are adjusted in a bit stream obtained in the manner to be described later, and output the resultant data. The modulating circuit 3 outputs a bit stream in which f1, f2 and dc components are restricted, and the modulating circuit 4 outputs a bit stream in which f1, f2 and dc components are restricted and on which an f1 or f2 component is superimposed.

In FIG. 4, reference numerals 5 and 6 respectively denote recording amplifiers. The recording amplifiers 5 and 6 input the bit streams output from the modulating circuits 3 and 4 to the heads ch1 and ch3 and to the heads ch2 and ch4, respectively.

The modulating circuits 3 and 4 will now be described in detail. Circuits similar to the modulating circuits 3 and 4 are disclosed in, for example, Japanese Patent Laid-Open No. hei 4-255969.

Figure 5:
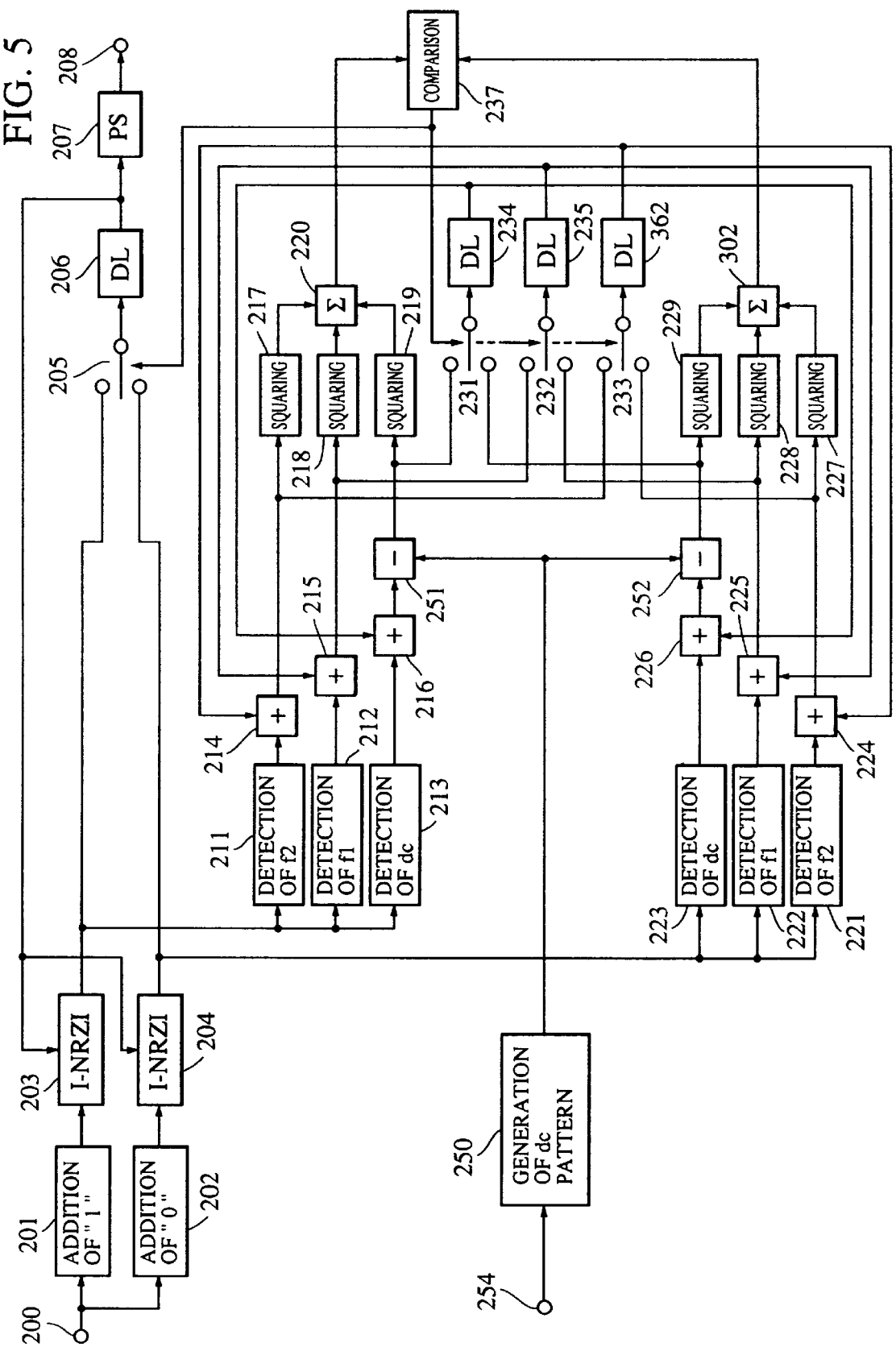
FIG. 5 is a block diagram showing an actually employed structure of modulating circuits shown in FIG. 4.

FIG. 5 illustrates the structure of the modulating circuits 3 and 4. 24-bit digital signals are input to an input terminal 200 from the digital recording signal processing circuit 2. 201, 202 add control bits "1" and "0" at the leading head of these 24 bits, and supply resultant 25-bit parallel data to an interleaved NRZI (I-NRZI) modulating circuits 203, 204. The I-NRZI modulating circuits 203, 204 employed in this embodiment perform exclusive OR operations on the odd bits and even bits, respectively, i.e., at every other bit. Any modulation method can be employed in this embodiment as long as it ensures that at least part of each of the words whose control bit is "0" and at least part of each of the words whose control bit is "1" have the opposite relationship. The I-NRZI modulating circuits 203 and 204 I-NRZI modulate the 25-bit data to which "1" and "0" are respectively added and output the resultant 25-bit data.

Reference numerals 211, 212 and 213 denote detection circuits for respectively detecting f2 components, f1 components, and dc components contained in the 25-bit data output from the I-NRZI modulating circuit 203. Reference numerals 221, 222 and 223 denote detection circuits for respectively detecting f2 components, f1 components, and dc components contained in the 25-bit data output from the I-NRZI modulating circuit 204. The dc components are detected by simply adding the input digital data after replacing "1" with +1 or "0" with −1, i.e., by obtaining DSV (digital sum value). To detect the frequency components f1 and f2, "1" of the input digital data is replaced with +1, while "0" is replaced with −1. Thereafter, the obtained digital data is respectively multiplied by bit patterns corresponding to cosine and sine waves of the frequency f1 or f2 to be detected, and the obtained two products are added to each other.

The dc components detected by the dc detection circuits 213 and 223 are supplied to adding circuits 216 and 226, respectively. The outputs of the f1 detecting circuits 212 and 222 are supplied to adding circuits 215 and 225, respectively. The outputs of the f2 detecting circuits 211 and 221 are supplied to adding circuits 214 and 224, respectively. The adding circuits 214, 215, 216, 224, 225 and 226 are designed to accumulate the previously obtained components, and receive, as another input, the previously obtained frequency components corresponding to the finally selected data rows through the delaying circuits 234, 235 and 236, respectively. As will be clear from the foregoing description, the outputs of the adding circuits 214, 215, 216, 224, 225 and 226 are equivalent to the data of the frequency area obtained by performing Fourier transform on the code row of the amplitude area.

Subtracters 251 and 252 subtract dc patterns accompanying the frequency components corresponding to pilot signals to be recorded from the the outputs of the adding circuits 216 and 226, respectively, and output the obtained data to square circuits 219 and 229. The outputs of the adding circuits 214, 215, 224 and 225 are respectively supplied to square circuits 217, 218, 227 and 228 to obtain values proportional to the energies of the respective components. An adding circuit 220 calculates the total sum of the outputs of the square circuits 217, 218 and 219. Similarly, an adding circuit 230 operates the total sum of the outputs of the square circuits 227, 228 and 229.

A comparing circuit 237 compares the outputs of the adding circuits 220 and 230 with each other to form control signals to be supplied to a switch 205 and switches 231, 232 and 233 on the basis of the results of the comparison. If the output of the adding circuit 220 is smaller than the output of the adding circuit 230, the modulated signal to the leading head of which control code "1" has been added is selected by the switch 205. If the output of the adding circuit 230 is smaller than the output of the adding circuit 220, the modulated signal to the leading head of which control code "0" has been added is selected by the switch 250. The switches 231, 232 and 233 are also controlled such that they output the accumulated values of the previously-obtained respective frequency components corresponding to the selected modulated signals. Accordingly, the delaying circuits 234, 235 and 236 delay the accumulated values of the previously obtained respective frequency components until when a subsequent word is input, and feedback the values to the adding circuits 214, 215, 216, 224, 225 and 226, respectively.

If no signal is output from a dc pattern generating circuit 250 and the dc components detected by the detecting circuits 213 and 223 are just passing through the subtracters 251 and 252, respectively, a modulated data row in which the energies of the components f1, f2 and dc are reduced is selected, and a bit stream obtained from the data output from the switch 205 has a spectrum in which the frequency areas dc, f1 and f2 are notched.

If the dc component corresponding to the frequency f1 is output from the DC pattern generating circuit 250 and is subtracted from the accumulated value of the dc components of the respective modulated data by the subtracters 251 and 252, it is controlled such that the energy of the data obtained by subtracting the dc pattern from the dc components is reduced, i.e., the dc components are made to coincide with the dc pattern.

Assuming that f1 is a frequency having a cycle of 100 bits in a bit stream, if it is desired to record f1 as a pilot signal, a data row whose spectrum has f1 components is output by supplying, as a dc pattern, a value which varies at a cycle of 4 words (4.25 bits). A data row whose spectrum has f1 components can be obtained by adding 0, a, 0, −a (a being a predetermined integer) in sequence per word to the accumulated value output from the adder 216 or 226. Assuming that f2 is a frequency having a cycle of 50 bits in a bit stream, if it is desired to record f2 as a pilot signal, a data row whose spectrum has f2 components is output by supplying, as a dc pattern, a value which varies at a cycle of 2 words (2.25 bits). A data row whose spectrum has f2 components can be obtained by alternately adding b and −b (b being a predetermined integer) per word to the accumulated value output from the adder 216 or 226.

The dc pattern generating circuit 250 corresponds to the f1,f2 pattern generating circuit 7 in the circuit shown in FIG. 4, and generates a pattern according to a drum rotation detection signal output from a rotation detecting circuit 9 for the rotary heads ch1, ch2, ch3 and ch4. In FIG. 5, the rotation detection signal is supplied from a terminal 254. Thus, digital data on which desired pilot signals f1 and f2 components are superimposed in a bit stream obtained from that digital data is output from the switch 205.

The output of the switch 205 is fed back to the I-NRZI circuits 203 and 204 through a delay circuit (DL) 206 so that 2 bits from the LSB can be utilized in the modulation of a subsequent word. The output of the delay circuit 206 is converted into a bit stream by a parallel-serial (PS) converting circuit 207 before being output from an output terminal 208.

The modulating circuit 3 shown in FIG. 4 corresponds to a circuit portion shown in FIG. 5 in which no dc pattern is generated from the dc pattern generating circuit 250. The output of the modulating circuit 3 is a data stream having a frequency spectrum in which the respective components dc, f1 and f2 are restricted. Regarding the modulating circuit 4, the dc pattern for generating f1 and the dc pattern used for generating f2 are generated from the f1 and f2 pattern generating circuit 7, corresponding to the dc pattern generating circuit 250 shown in FIG. 5, each time the rotary heads make half a rotation, as mentioned above, and a bit stream in which the pilot signals f1 and f2 are alternately superimposed each time the rotary heads make half a rotation is output from the modulating circuit 4.

In this embodiment, recording or reproduction of four tracks is performed each time the drum makes a rotation. Thus, scanning of tracks for a single frame takes 2.5 rotations of the drum, and the pilot rotation is synchronized with the frame every two frames (20 tracks).

Figure 6:
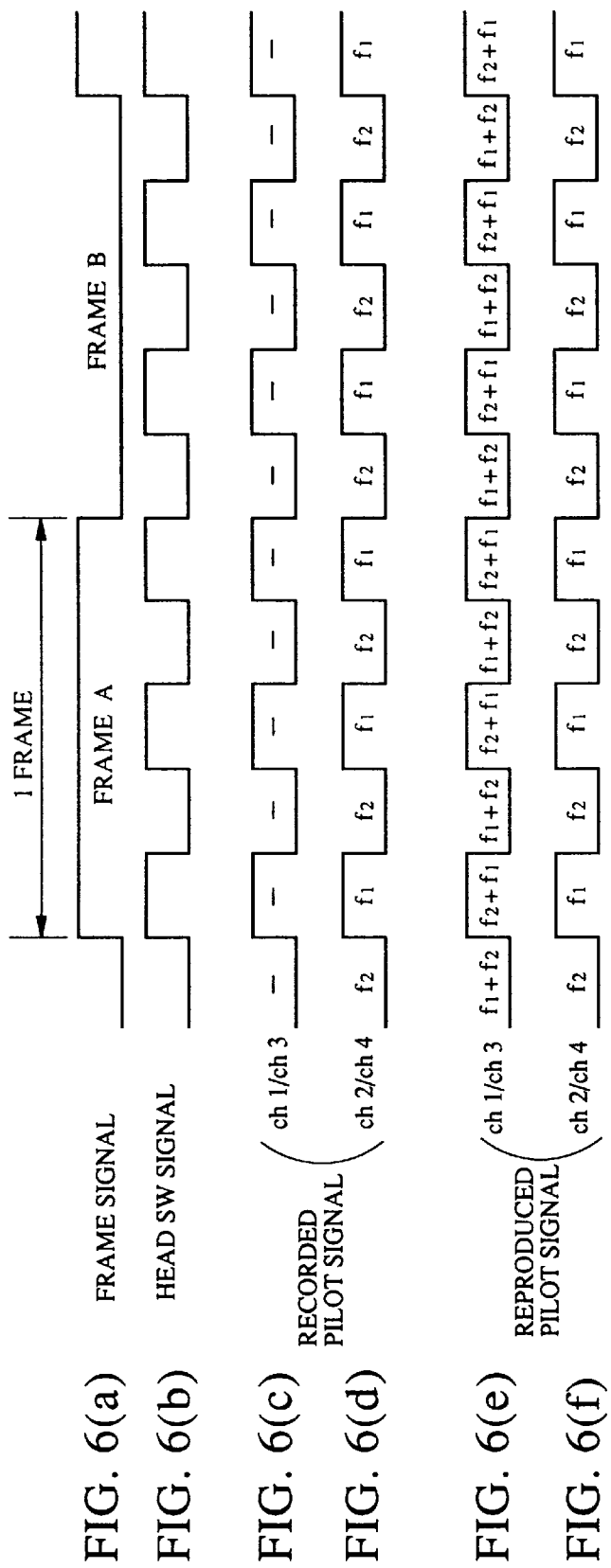
FIGS. 6(a)–(f) are timing charts of pilot signals recorded and reproduced by the heads in a first embodiment of the present invention.

FIG. 6 is a timing chart of pilot signals recorded in such a manner they are superimposed on a main signal by the respective heads (ch1 through ch4), and of pilot signals reproduced from the respective heads during reproduction.

FIG. 6(a) shows the frame data for recording or reproduction. FIG. 6(b) shows a head switching signal. FIG. 6(c) shows the timing of the pilot signals formed by the modulating circuit 3 and recorded by the heads ch1 and ch3. The pilot signals are not superimposed, as is seen from FIG. 6(c). FIG. 6(d) shows the timing of the pilot signals formed by the modulating circuit 4 and recorded from the heads ch2 and ch4. The pilot signals f1 and f2 are alternately superimposed. FIG. 6(e) shows the reproduction timing of the pilot components reproduced from the heads ch1 and ch3 under an excellent tracking condition. FIG. 6(f) similarly shows the reproduction timing of the pilot signals reproduced from the heads ch2 and ch4.

Figure 1:
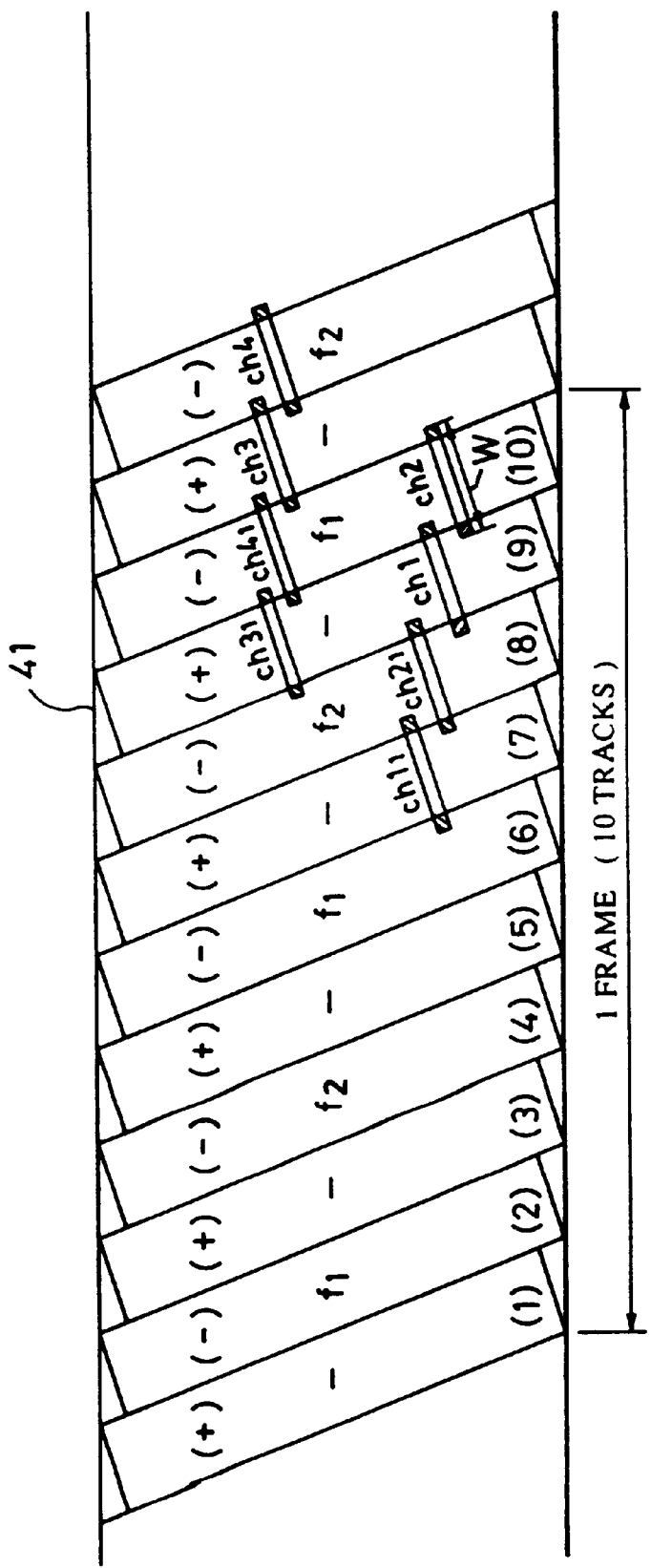
FIG. 1 illustrates a recording pattern on a tape according to the pilot signal multiplex tracking method to which the present invention can be applied.

When a head width w of each of the heads is made larger than the track pitch, as shown in FIG. 1, the pilot signals recorded on the tracks adjacent to the track from which the main signal is being reproduced can be reproduced as crosstalk at the reproduction timing by the heads ch1 and ch3. A tracking error signal (ATF error signal) can be obtained by utilizing the fact that the amounts of two crosstalks are equal to each other under an excellent tracking condition.

Figure 7:
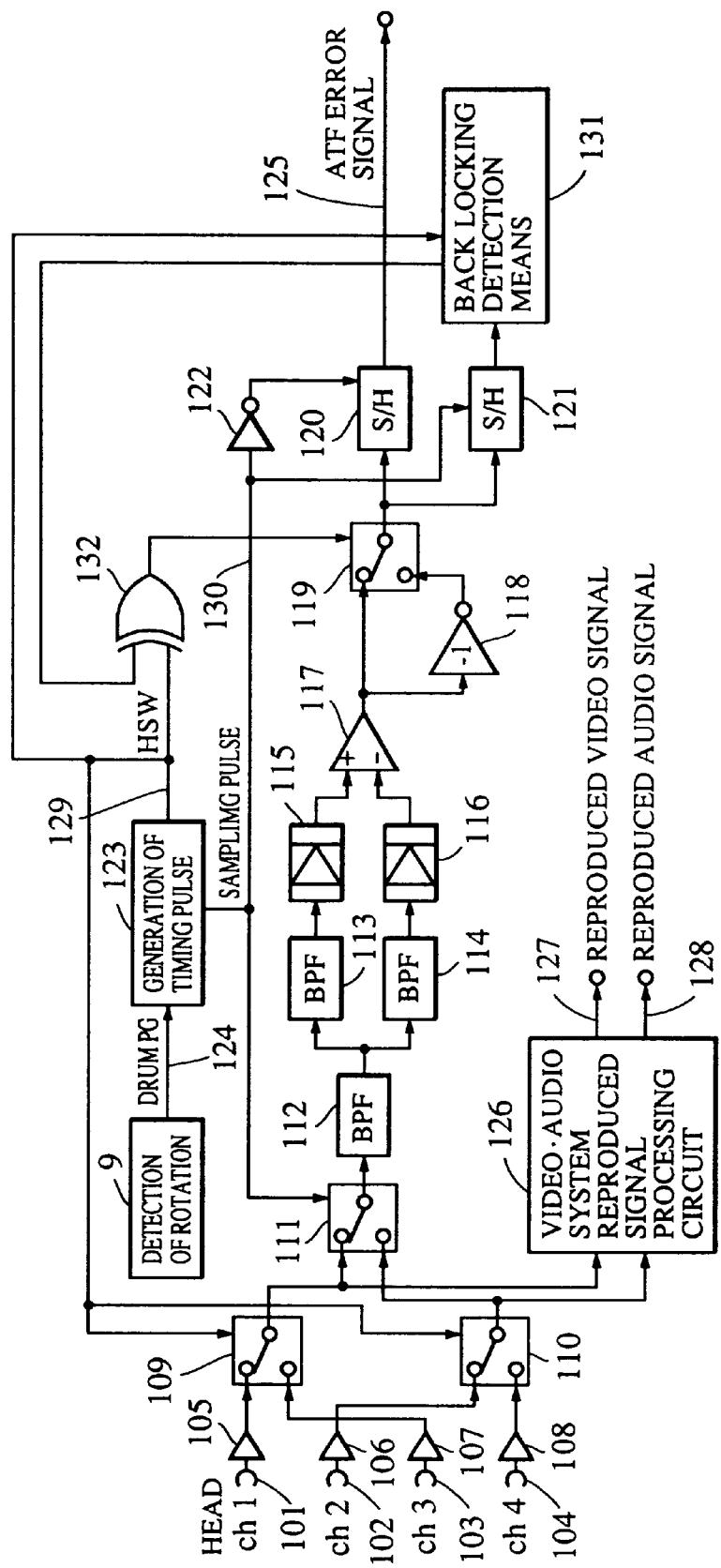
FIG. 7 is a circuit diagram of a reproducing system for detecting an ATF error signal in the first embodiment.

FIG. 7 is a block diagram of a circuit for detecting the ATF error signal during reproduction.

Reference numeral 101 denotes a reproduction head of ch1. Reference numeral 102 denotes a reproduction head of ch2. Reference numeral 103 denotes a reproduction head of ch3. Reference numeral 104 denotes a reproduction head of ch4. Reference numerals 105 through 108 respectively denote amplifiers for amplifying the reproduction signals from the reproduction heads 101 through 104. Reference numeral 109 denotes a switch (SW) circuit for selecting the reproduction output of ch1 or the reproduction output of ch3. Reference numeral 110 denotes a SW circuit for selecting either the reproduction output of ch2 or the reproduction output of ch4. Reference numeral 111 denotes a SW circuit for selecting either the output of the SW 109 or the output of the SW 110.

Reference numeral 112 denotes a band-pass filter (BPF) for extracting the frequency band of the pilot signals from the reproduction signal selected by the SW circuit 111. Reference numerals 113 and 114 denote BPFs for extracting the reproduced pilot components of f2 and f1. Reference numerals 115 and 116 denote detection circuits for converting the reproduced pilot signals extracted by the BPFs 113 and 114 into a dc level. Reference numeral 117 denotes a differential amplifier which receives the detection outputs of the detection circuits 115 and 116. Reference numeral 118 denotes an inverting amplifier for inverting the output of the differential amplifier 117. Reference numeral 119 denotes a SW circuit for selecting either the output of the differential amplifier 117 or the output of the inverting amplifier 118. Reference numerals 120 and 121 denote S/H circuits for sample/holding the output signal of the SW circuit 119. Reference numeral 122 denotes an inverter circuit for inverting and supplying a sampling pulse 130, which will be described later, to the S/H circuit 120.

Reference numeral 123 denotes a timing pulse generating circuit for generating timing signals, such as a head SW pulse 129 (HSW) and sampling pulse 130, from the drum rotation detection signal 124 (drum PG) from the rotation detecting circuit 9 also shown in FIG. 4. Reference numeral 124 denotes a PG pulse detected as a result of the rotation of the drum. Reference numeral 125 denotes an ATF error signal for controlling the rotational speed of a capstan for tracking control.

Reference numeral 126 denotes a reproduction signal processing circuit for demodulating and outputting main signals, i.e., a video signal and an audio signal, from the signals selected by the SW circuits 109 and 110. Reference numeral 127 denotes a reproduced video signal. Reference numeral 128 denotes a reproduced audio signal.

As mentioned above, in the system of this embodiment, the reproduced pilot signal components used to obtain an ATF error signal are contained in the signals reproduced by the heads ch1 and ch3 of (+) azimuth as the crosstalk components from the adjacent tracks ((−) azimuth tracks). Thus, the necessary signals are the reproduced signals of the heads ch1 and ch3 among the four heads. When the SW circuit 111 is connected to the SW circuit 109, a reproduced signal used to obtain an ATF error signal is output from the SW circuit 111. Since the reproduced signal also contains the main signals, it is supplied to the video/audio system reproduced signal processing circuit 126. At the same time, the reproduced signal is also applied to the BPF 112 to extract the reproduced pilot signals in the ATF circuit. Thereafter, the crosstalk pilot components of f1 and f2 are separated and detected and then compared with each other by the differential amplifier 117 to obtain an ATF error signal.

To cope with changes in the track positions for f1 and f2 with respect to the heads ch1 and ch3, the output of the inverting amplifier 118 is selected by the SW circuit 119 synchronously with HSW when the head ch3 is selected, whereby an ATF error signal is obtained.

Figure 2:
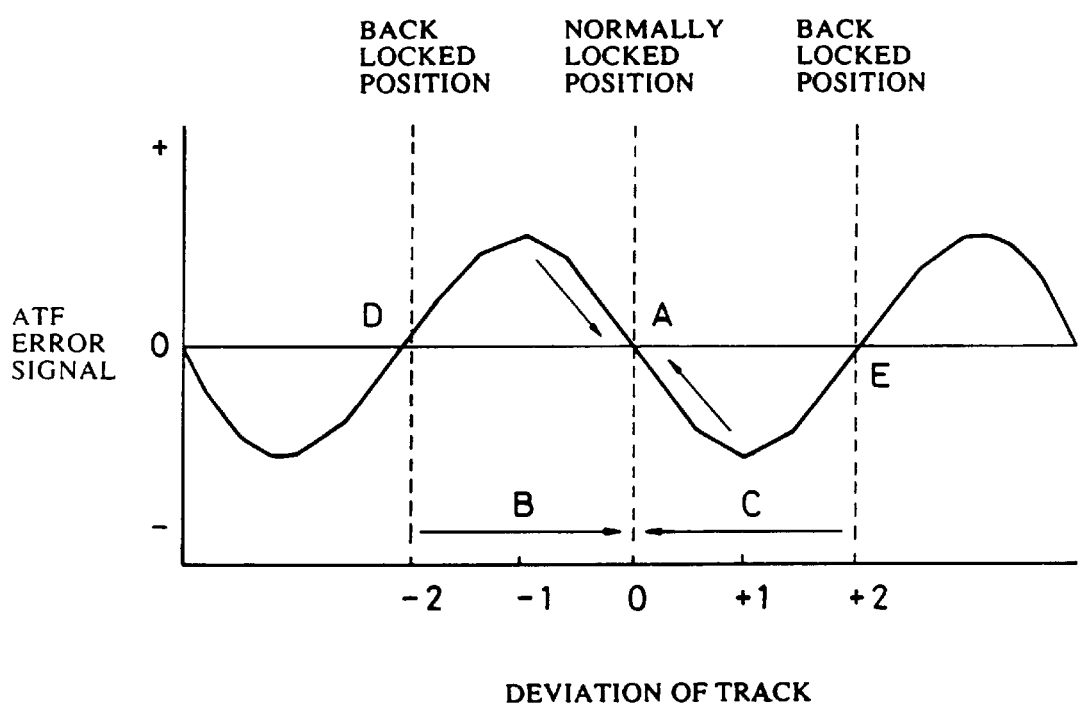
FIG. 2 illustrates a tracking (ATF) error signal obtained by the tracking method shown in FIG. 1.

The ATF error signal and the ATF locking characteristics are shown in FIG. 2.

Tracking control is performed such that the track is locked at a position indicated by A where the ATF error signal is zero by advancing the tape in a direction indicated by an arrow B by an amount corresponding to the magnitude of the ATF error signal when the ATF error signal is plus and by returning the tape in a direction indicated by an arrow C by a distance corresponding to the magnitude of the ATF error signal when the ATF error signal is minus.

Thus, the basic configuration for obtaining an ATF error signal for tracking control during reproduction alternately employs the reproduction signals of ch1 and ch3, as mentioned above. In addition to this, the reproduction signals of the heads ch2 and ch4 are also applied to the BPF 112 synchronously with the rotation of the drum in this embodiment because of the provision of the SW circuit 111.

Reference numeral 129 denotes a HSW pulse for selecting the reproduction heads synchronously with the rotation of the drum. Reference numeral 130 denotes a sampling pulse used to select the heads ch2 and ch4 which cannot detect an ATF error signal temporarily synchronously with the rotation of the drum. Reference numeral 131 denotes back locking detection means for detecting back locking by determining the type of the pilot components from the output of the S/H circuit 121. Reference numeral 132 denotes an EXOR circuit for inverting the logic of the HSW 129 to be sent to the SW circuit 119 when back locking is detected by the back locking detection means 131.

Figure 8:
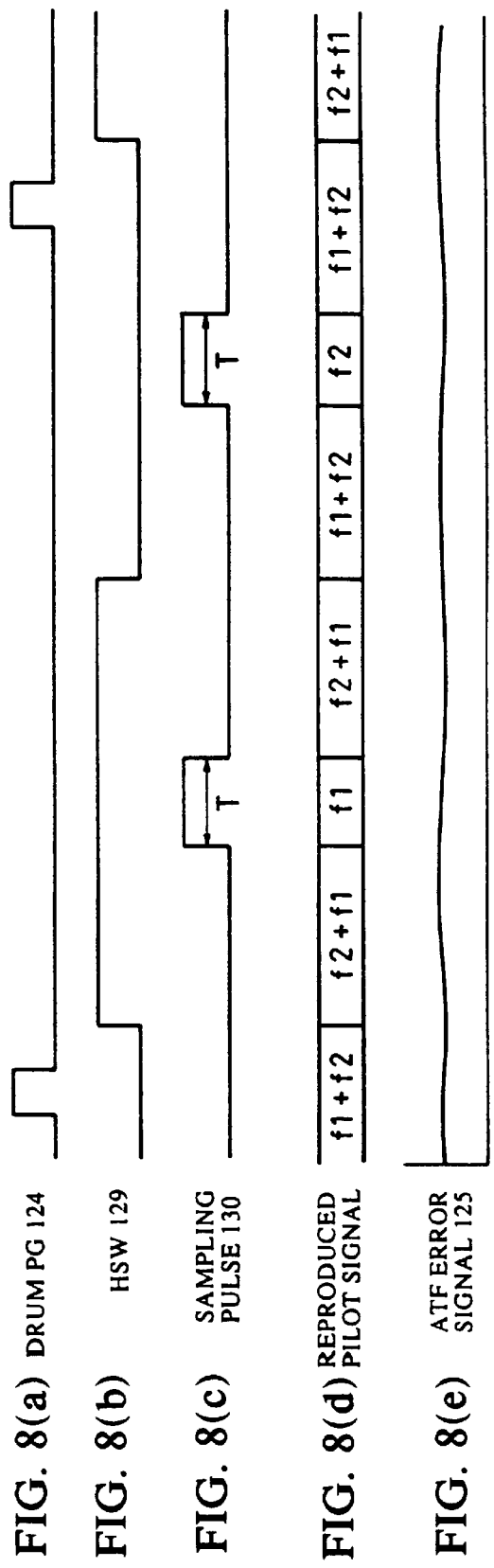
FIGS. 8(a)–(e) are timing charts of signals employed in the circuit shown in FIG. 7.

FIG. 8 is a timing chart showing the timing of the respective signals employed in the circuit shown in FIG. 7 in the normal reproduction mode. The circuit operation of this embodiment will be described below with reference to FIGS. 7 and 8. In the 4-head VTR of this embodiment, since the head pair, consisting of ch1 head 101 and ch2 head 103, and the head pair, consisting of ch2 head 102 and ch4 head 104, trace the tape alternately, recording or reproduction can be performed almost concurrently on the two tracks. Accordingly, both the output of the SW circuit 109 for selecting the reproduction signals of ch1 and ch3 and the output of the SW circuit 110 for selecting the reproduction signals of ch2 and ch4 are obtained almost concurrently as the reproduced RF signal. The reproduced signal processing circuit 126 demodulates the two reproduced RF signals to obtain the reproduced video signal 127 and the reproduced audio signal 128.

As can be seen from FIGS. 1 and 6, it is impossible to obtain adjoining crosstalk (pilot crosstalk) used to detect an ATF error signal from ch2 and ch4 heads 102 and 104. However, the main tracks of ch2 and ch4 heads 102 and 104 are very effective to detect back locking because the pilot signals are superimposed on the main signals of the main tracks. This embodiment is based on this, and carries out the back locking detection, which is achieved by determining the type of main pilot signals, without adversely affecting the detection of an ATF error signal by operating the S/H circuits 120 and 121 in inverted timings, which is achieved by the provision of the inverter 122.

Figure 9:
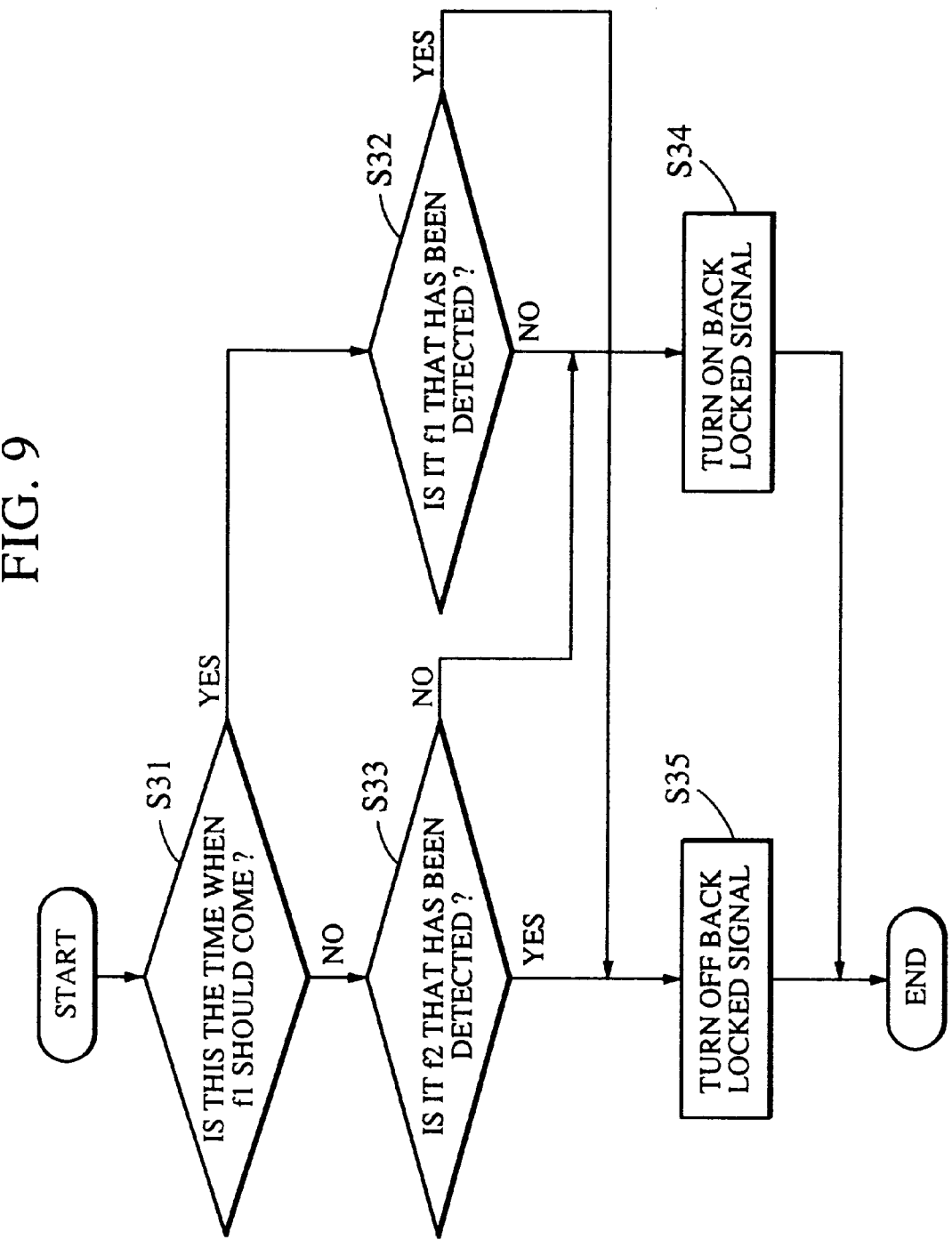
FIG. 9 is a flowchart showing an example of a detection flow in back locking detection means in the circuit shown in FIG. 7.

FIG. 9 is a flowchart for the back locking detection carried out by the back locking detection means 131 shown in FIG. 7. In FIG. 9, it is determined in step S31 whether this is the time when the pilot signal superimposed on the reproduction signal from the head ch2 or ch4 should be f1. As can be seen from FIG. 1, when the pair of heads ch1 and ch2 are scanning the tracks, the pilot signal of ch2 should be f1. Thus, in this case, the process goes from step S31 to step S32. When the pair of heads ch3 and ch4 are scanning the tracks, the pilot signal of ch4 should be f2. In this case, the process goes to step S33. This determination can be made by checking the level of the HSW pulse output from the timing pulse generating circuit 123.

Step S32 is the process in which it is determined whether or not f1 is being detected when the pilot signal should be f1. When the f1 component is being detected from the ch2 head at a predetermined threshold value or above, as in the case of the pair of heads ch1 and ch2 shown in FIG. 1, the process goes to step S35, and the back locking signal is turned off. When the pilot crosstalks are equal to each other and the scanning tracks having the same azimuth are two tracks apart and when the f2 component is being detected from ch2 at a predetermined threshold or above, as in the case of the pair of heads ch1 and ch2, the back locking signal is turned on in step S34.

Step S33 is the process in which it is determined whether or not f2 is being detected when the pilot signal should be f2. When the f2 component is being detected from the ch4 head at a predetermined threshold value or above, as in the case of the pair of heads ch3 and ch4 shown in FIG. 1, the process goes to step S35, and the back locking signal is turned off. When the scanning tracks are two tracks apart and when the f1 component is being detected from ch4 at a predetermined threshold or above, as in the case of the pair of heads ch3 and ch4, the back locking signal is turned on in step S34.

The back locking signal ON obtained in step S34 and the back locking signal OFF obtained in step S35 are sent to the EXOR circuit 132 shown in FIG. 7. When the back locking signal is ON, the EXOR circuit 132 inverts the logic of HSW 129 and sends the inverted logic to the SW circuit 119.

Figure 10:
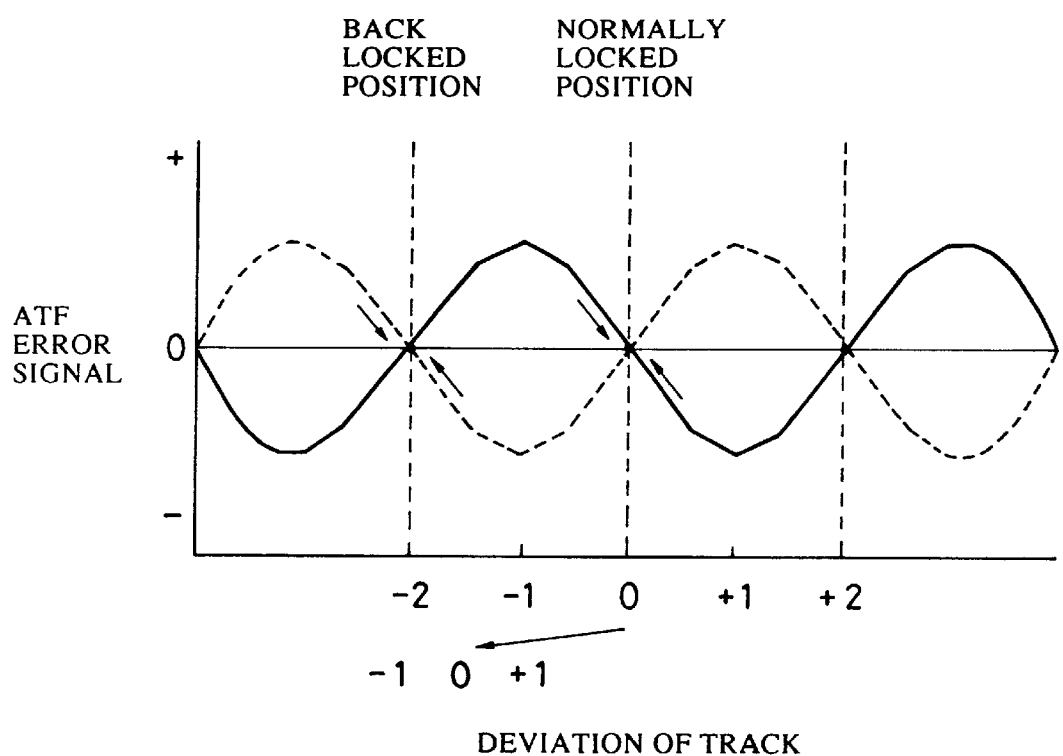
FIG. 10 illustrates an ATF error signal and ATF locking characteristics in the first embodiment.

FIG. 10 illustrates the ATF error signal and the ATF locking characteristics. When back locking is detected by the back locking detection means 131 shown in FIG. 7, the logic of the SW circuit 119 is reversed to reverse the ATF error signal indicated by the solid line in the manner shown by the broken line. Consequently, after detection of back locking, tracking control is performed with ATF locking characteristics in which the back locked position which deviates from the normal locked position by two tracks is the normal locked position.

In this embodiment, A/D converting circuits may be used in place of the sample hold circuits.

Figure 11:
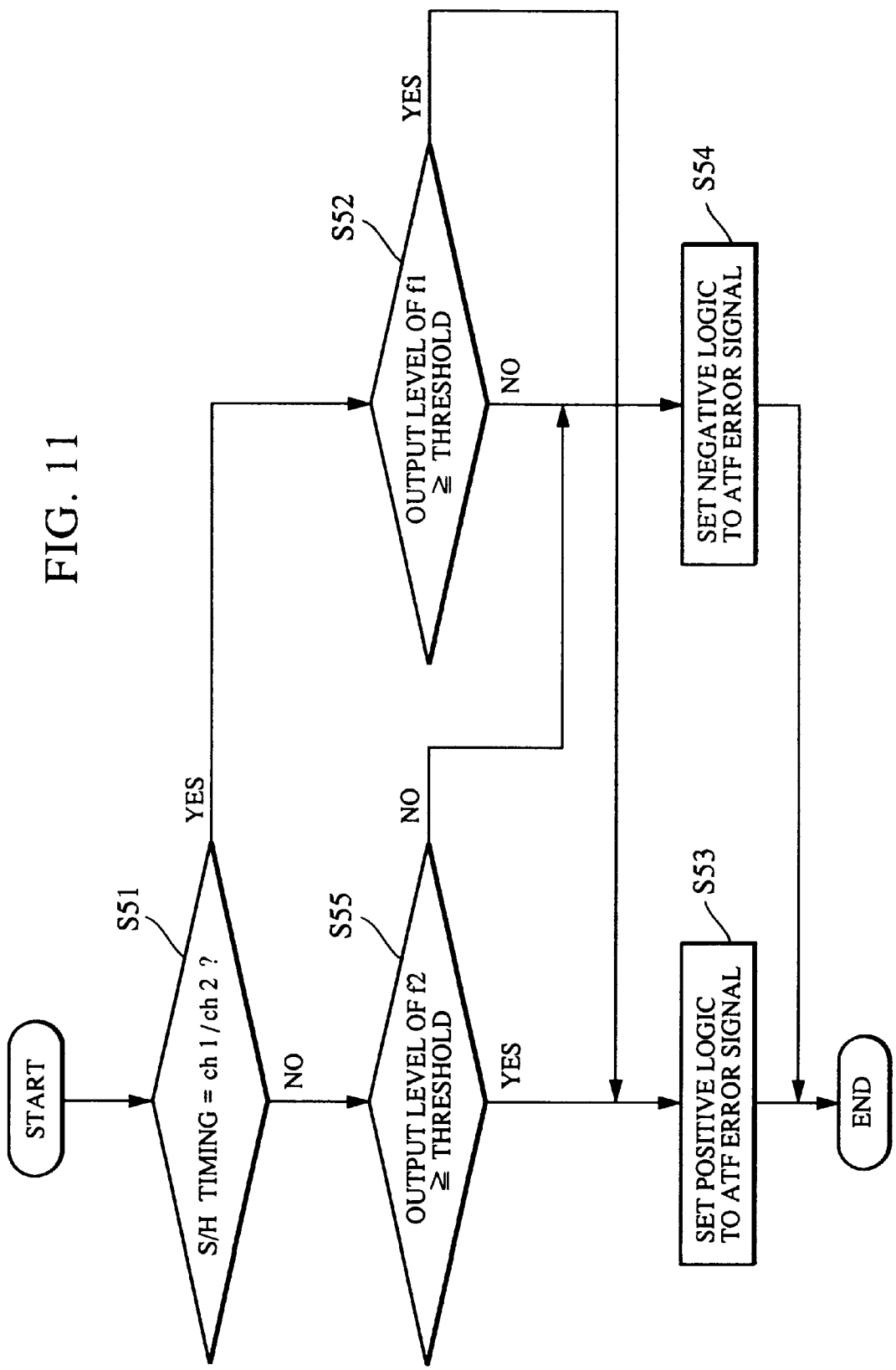
FIG. 11 is a flowchart showing another example of the detection flow in the back locking detection means in the circuit shown in FIG. 7.

FIG. 11 is a flowchart showing another example of back locking detection performed by the back locking detection means 131. In the configuration shown in FIG. 11, it is possible to perform excellent tracking control without generating back locking by selecting the logic of the ATF error signal and by performing tracking control using the closest track having the same azimuth.

In FIG. 11, it is determined in step S51 whether or not it is the time for S/H of ch1 and ch2. If it is the time for S/H, it is determined in step S52 whether or not the level of f1 is equal to or greater than a predetermined threshold level. If the level of f1 is equal to or greater than the predetermined threshold level, a positive logic is set in the ATF error signal in step S53. If the level of f1 is less than the predetermined threshold level, the ATF error signal is inverted in step S54.

If it is determined in step S51 that it is not the time for S/H of ch1 and ch2, it is determined in step S55 whether or not the level of f2 is equal to or greater than a predetermined threshold level. If the level of f2 is equal to or greater than the predetermined threshold level, the process goes to step S53. If the level of f2 is less than the predetermined threshold level, the process goes to step S54.

In the first embodiment, a back locked state can be detected by detecting the type of pilot signal reproduced from a track adjoining to a track from which a main signal is being reproduced using an adjoining rotary head, and a tracking controlled state can thus be obtained without delay.

A second embodiment of the present invention will now be described below.

Figure 12:
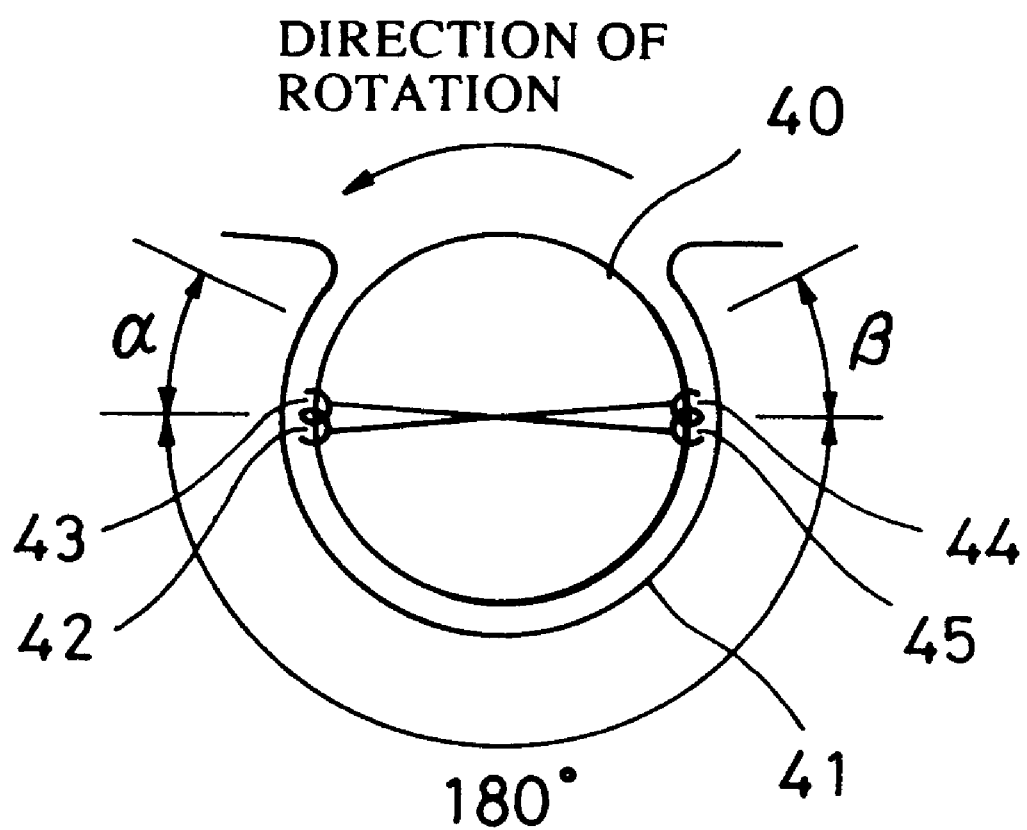
FIG. 12 is a schematic view showing the structure of the vicinity of a drum of a VTR used in a second embodiment of the present invention.

FIG. 12 is a schematic plan view of a drum portion of a VTR employed in the second embodiment. Identical reference numerals in FIG. 12 to those in FIG. 3 represent similar or identical elements. In this embodiment, the tape 41 is wound around the rotary drum 40 over 180 degrees which forms a main signal recording portion thereof and additionally over α degrees at a drum entering portion and over β degrees at a drum leaving portion. While one head of each head pair is tracing these additionally wound portions, the other head of each head pair is tracing the main signal recording portion. Thus, these additionally wound portions are called overlapping recording portions.

As shown in FIG. 3(b), the heads ch2 and ch4 are offset from the heads ch1 and ch3 in an upward direction by a distance 'h'.

Figure 13:
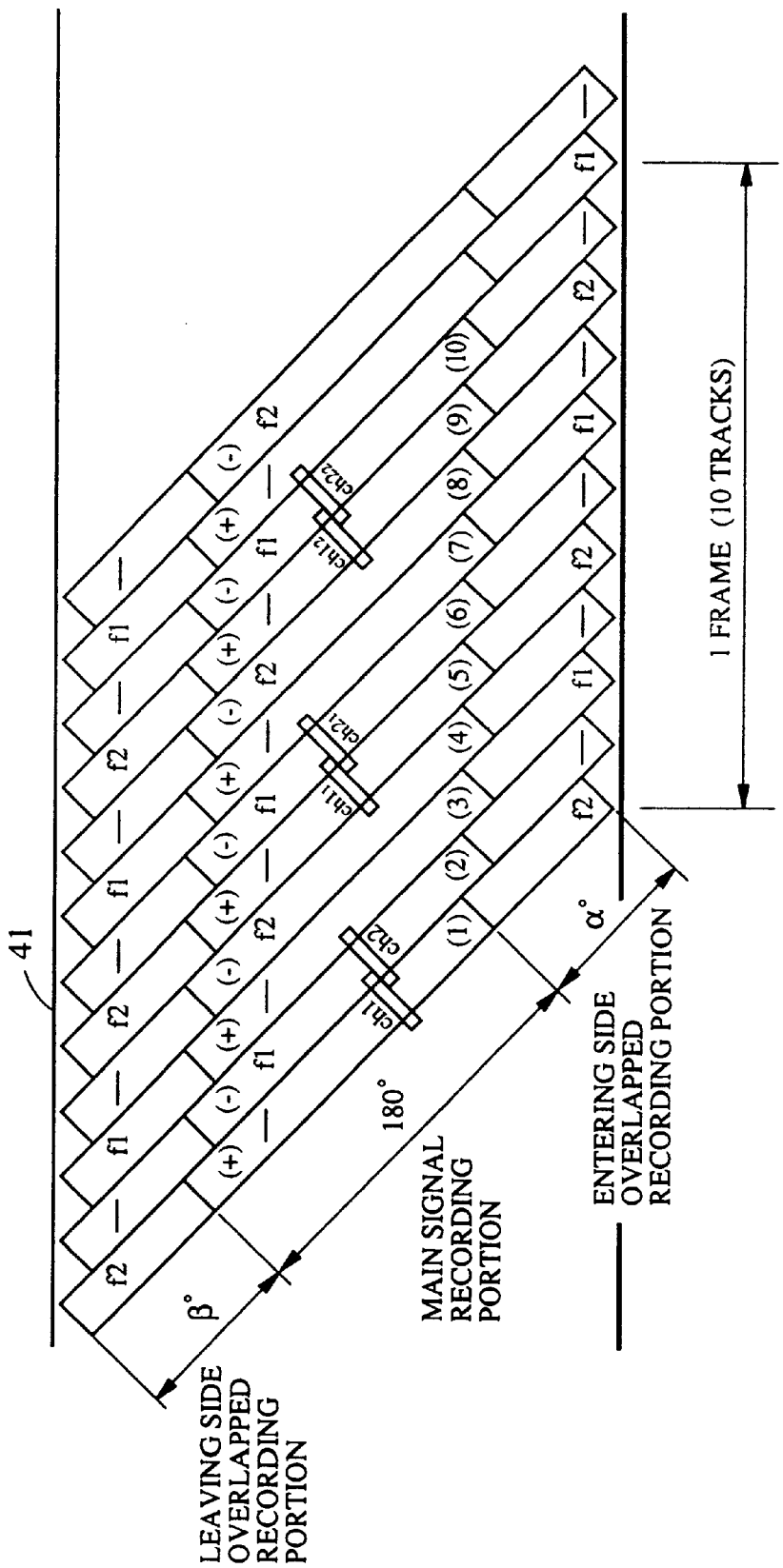
FIG. 13 illustrates a recording pattern on a tape according to the second embodiment.

FIG. 13 illustrates a recording pattern on the tape 41 in the second embodiment. Two types of pilot signals, f1 and f2, are used to obtain a tracking error signal. The pilot signals are superimposed on both the main signal recording portions and the overlapping recording portions at every other track. The pilot signals are recorded in a regular order: in the main signal recording portion, no pilot signal is superimposed in tracks whose head azimuth is (+), and f1 and f2 are alternately superimposed in (−) tracks. In the overlap recording portions, f1 and f2 are alternately superimposed in tracks where head azimuth is (+), and no pilot signal is superimposed in (−) tracks.

Figure 14:
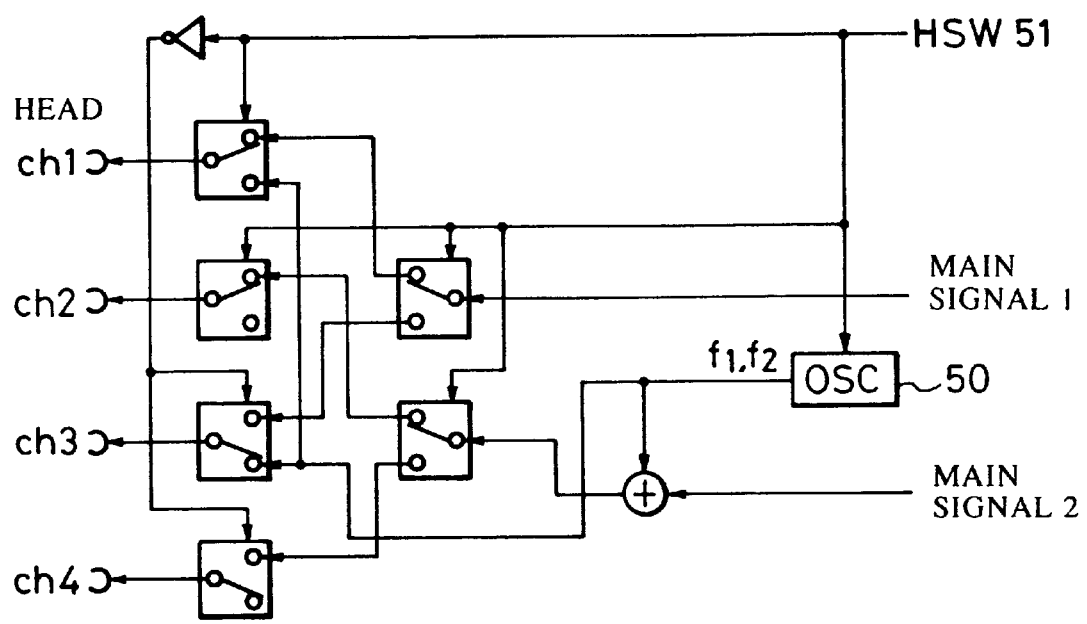
FIG. 14 is a block diagram of the essential parts of a recording circuit when pilot signals are analogously superimposed in the second embodiment.

FIG. 14 is a block diagram of the essential parts of a recording circuit for multiple-recording pilot signals on the main signals. Reference numeral 50 denotes a pilot signal oscillator. Reference numeral 51 denotes a head SW signal for switching over the oscillated frequencies f1 and f2 of the pilot signal oscillator 50 and the SW circuits synchronously with the rotation of the drum. HSW 51 is the same as the head SW pulse shown in FIG. 7.

Figure 15:
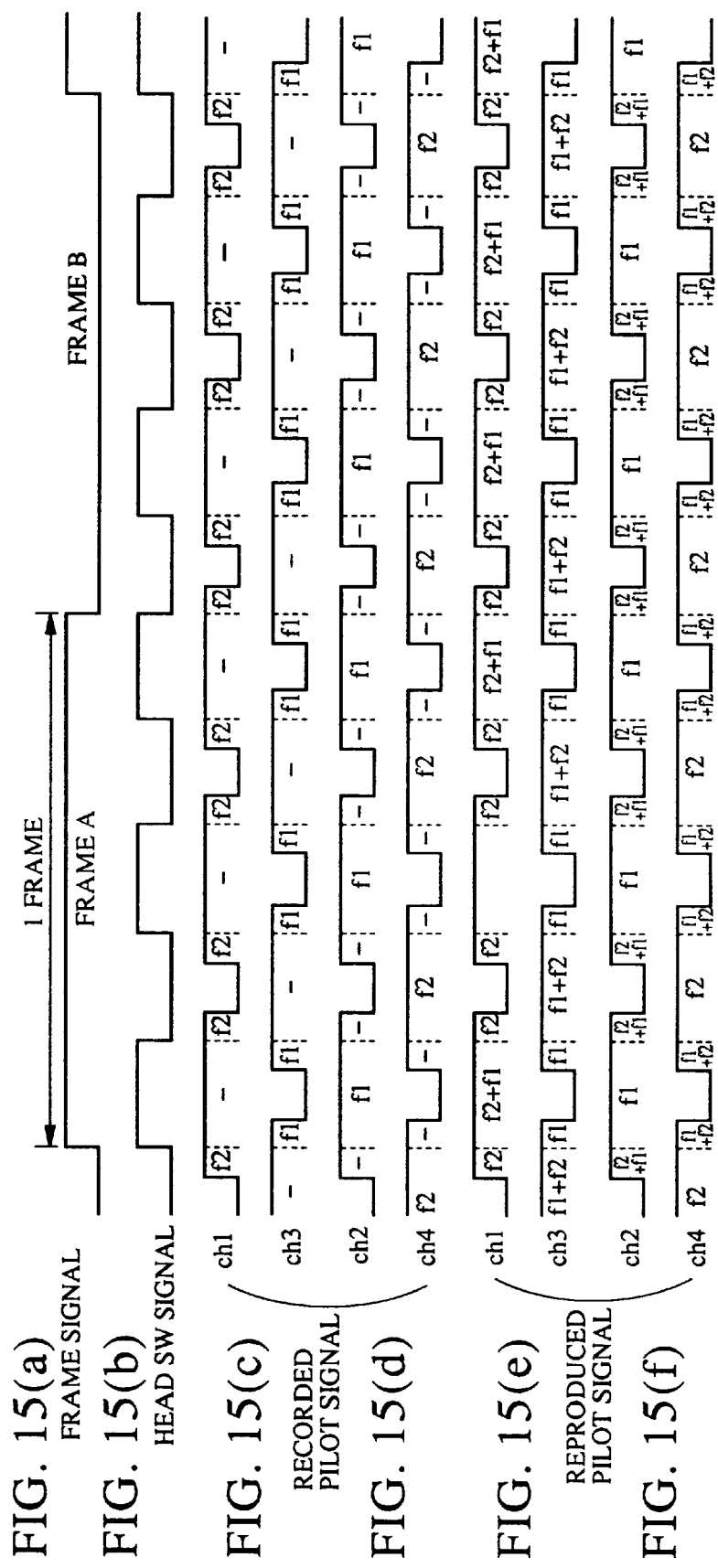
FIGS. 15(a)–(f) are timing charts of pilot signals recorded and reproduced by the heads when the circuit shown in FIG. 14 is used.

FIG. 15 is a timing chart showing the pilot signals superimposed on the main signal recording portion and the overlap recording portions during recording, and the pilot signals reproduced from the respective heads during reproduction.

FIG. 15(a) shows the frame data during recording or reproduction. FIG. 15(b) shows the head SW (HSW) signal. FIG. 15(c) shows the pilot signals recorded from the heads ch1 and ch3 during recording. As shown in FIG. 15(c), no pilot signal is superimposed on the main signal recording portion, and the pilot signals having frequencies f1 and f2 are alternately recorded in the overlap recording portions. FIG. 15(d) is a timing chart of the pilot signals recorded from the heads ch2 and ch4. As shown in FIG. 15(d), the pilot signals having frequencies f1 and f2 are alternately recorded in the main signal recording portion, and no pilot signal is superimposed on the overlap recording portions. FIG. 15(e) shows the reproduction timing of the pilot components reproduced from the heads ch1 and ch3 under an excellent reproduction tracking condition. FIG. 15(f) shows the reproduction timing of the pilot components similarly reproduced from the heads ch2 and ch4.

Figure 16:
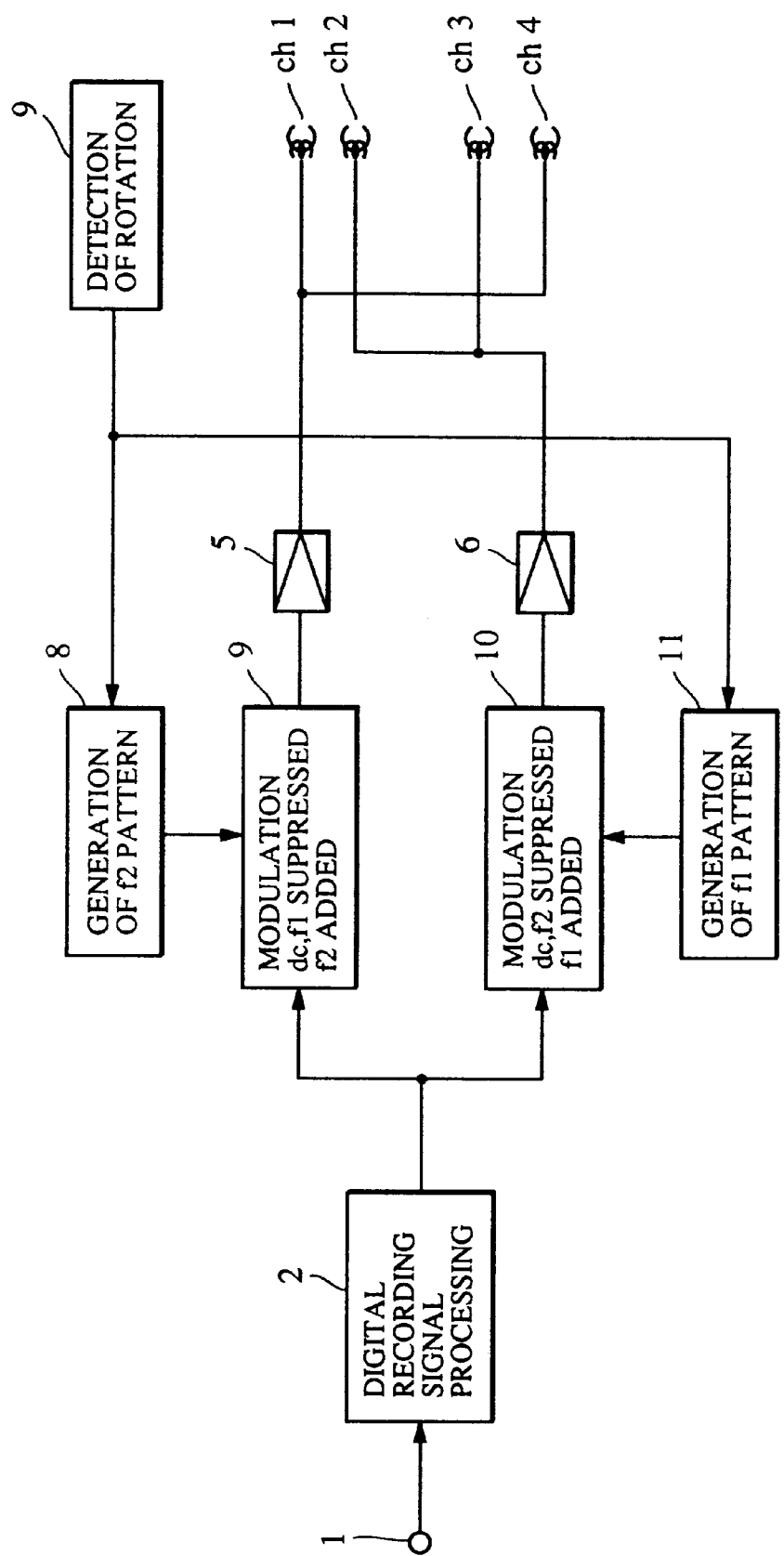
FIG. 16 illustrates the structure of a recording circuit when pilot signals are digitally superimposed in the second embodiment.

FIG. 16 shows another example of a recording system for a digital VTR which digitally records pilot signals.

Identical reference numerals in FIG. 16 to those in FIG. 4 represent similar or identical elements, and further description thereof is omitted. In FIG. 16, a f2 pattern generating circuit 8, corresponding to the dc pattern generating circuit shown in FIG. 5, generates a dc pattern for f2 generation only during the half rotation of the head ch1 in which the head traces the main signal recording portion. A modulating circuit 9 outputs a bit stream in which the pilot signal f2 is superimposed each time the rotary head makes half a rotation. Regarding a modulating circuit 10, a f1 pattern generating circuit 11, corresponding to a dc pattern generating circuit 250 shown in FIG. 5, generates a dc pattern for f1 generation only during the half rotation of the head ch2 during which the head ch2 traces the main signal recording portion. The modulating circuit 10 outputs a bit stream in which the pilot signal f1 is superimposed each time the rotary head makes half a rotation.

When the structure shown in FIG. 16 is provided, i.e., when the heads ch2 and ch3 for recording f1 are commonly connected while the heads ch1 and ch4 for recording f2 are commonly connected, the recording pattern shown in FIG. 13 can be readily recorded.

Figure 17:
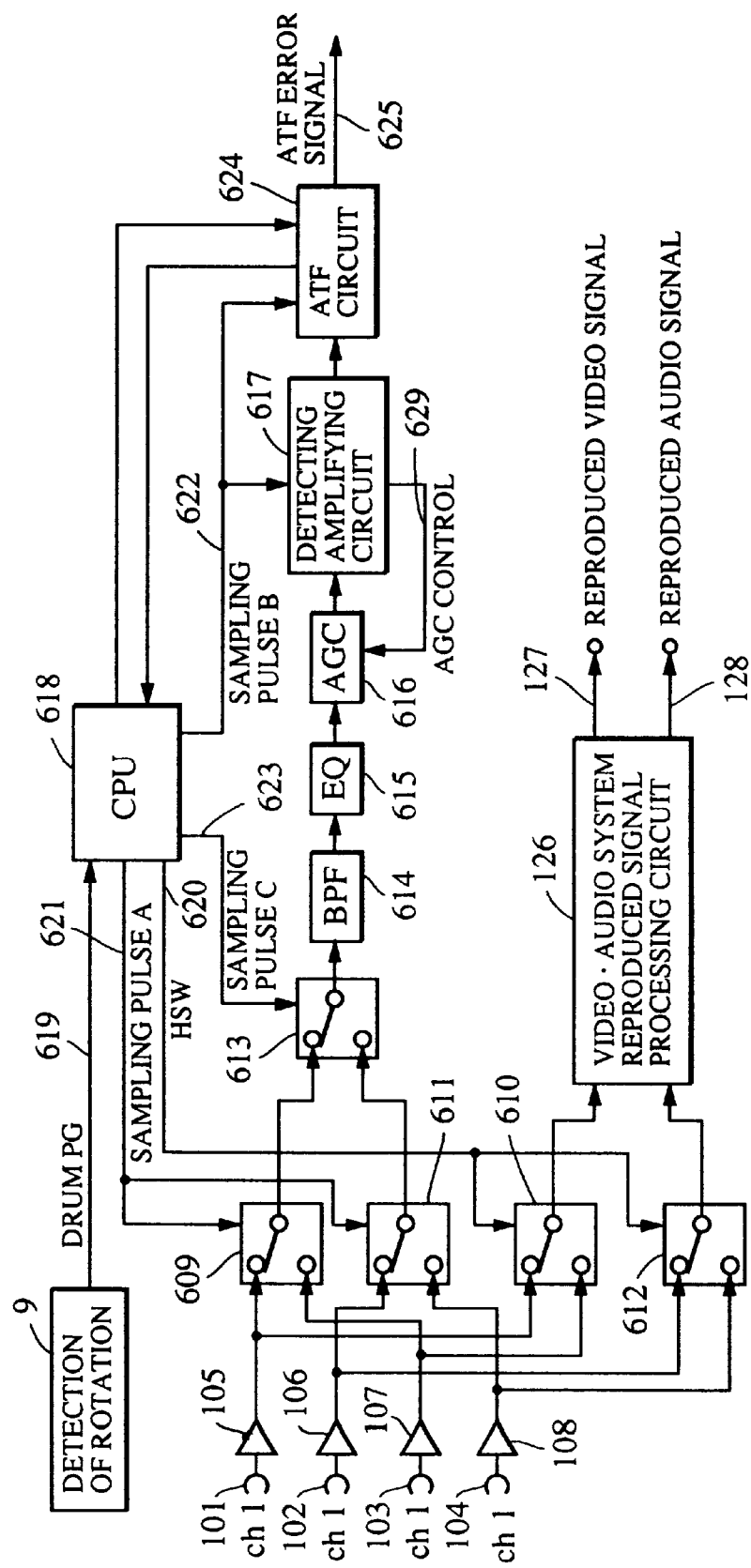
FIG. 17 is a circuit diagram of a reproduction system of the second embodiment.

FIG. 17 is a block diagram of a reproduction system of the second embodiment. In FIG. 17, reference numeral 101 denotes a reproduction head ch1. Reference numeral 102 denotes a reproduction head ch2. Reference numeral 103 denotes a ch3 reproduction head. Reference numeral 104 denotes a ch4 reproduction head. Reference numerals 105 through 108 denote amplifiers for amplifying the reproduced signals of the reproduction heads 101 through 104, respectively. Reference numerals 609 and 610 denote SW circuits for selecting either the reproduction output of the head ch1 or the reproduction output of the head ch3. Reference numerals 611 and 612 denote SW circuits for selecting either the reproduction output of the head ch2 or the reproduction output of the head ch4. Reference numeral 613 denotes a SW circuit for selecting either the output of the SW circuit 609 or the output of the SW circuit 611.

Reference numeral 614 denotes a band-pass filter (BPF) for extracting the frequency band of the pilot signal from the reproduction signal selected by the SW circuit 613. Reference numeral 615 denotes an equalizer for correcting the reproduction gain of the extracted reproduced pilot signal to the same level. Reference numeral 616 denotes an AGC circuit for correcting variations in the level of the reproduced pilot signal, caused by variations in the tape characteristics or in the recording current. Reference numeral 617 denotes a detector/amplifier circuit for converting the reproduced pilot signals of f2 and f1 into a dc level and for differential amplifying the detected output.

Reference numeral 618 denotes a microcomputer (CPU) for generating various timing signals, including a head SW pulse 620 (HSW), a sampling pulse A621, a sampling pulse B 622 and a sampling pulse C623, from a drum phase detection signal 619 (drum PG) from the rotation detector 9 and for controlling the ATF circuit 624. Reference numeral 619 denotes a PG pulse detected by the rotation of the drum. Reference numeral 620 denotes a HSW pulse for selecting either of the reproduction heads synchronously with the rotation of the drum. Reference numeral 621 denotes a sampling pulse A for selecting either of the reproduction heads synchronously with the rotation of the drum. Reference numeral 622 denotes a sampling pulse B for instructing the detector/amplifier circuit 617 to perform AGC control synchronously with the rotation of the drum and for instructing the ATF circuit 624 to send the data required for back locking determination to the CPU 618.

Reference numeral 623 denotes a sampling pulse C for selecting the heads ch2 and ch4. Reference numeral 624 denotes an ATF circuit for generating an ATF error signal 625 from the output of the detector/amplifier circuit 617 under the control of the CPU 618. Reference numeral 625 denotes an ATF error signal used for performing tracking control by controlling the rotational speed of a capstan. Reference numeral 126 denotes a reproduced signal processing circuit for demodulating a main signal, including a video signal and an audio signal, from the signals selected by the SW circuits 610 and 612. Reference numeral 127 denotes a reproduced video signal. Reference numeral 128 denotes a reproduced audio signal.

Reference numeral 629 denotes an output of the detector/amplifier circuit 617 which controls the gain of the AGC amplifier 616 to control the level of the reproduced pilot signal to an adequate level.

Figure 18:
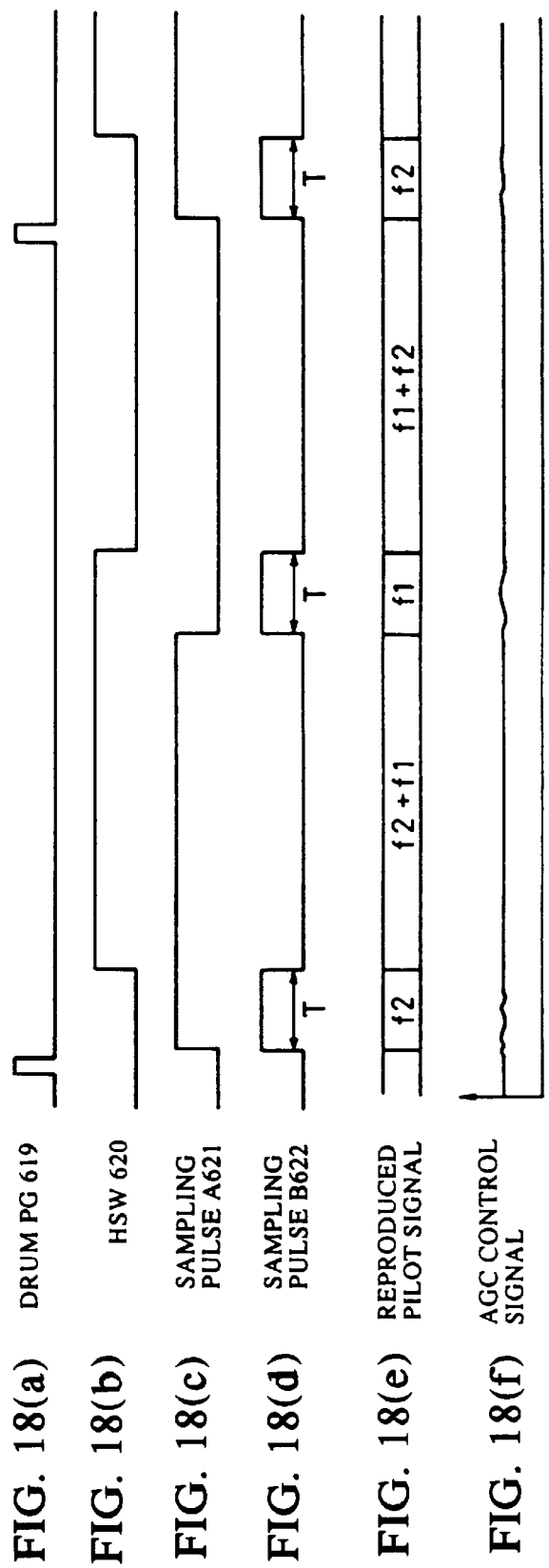
FIGS. 18(a)–(f) are timing charts of signals used in the reproducing circuit shown in FIG. 17 in the normal reproduction mode.

FIG. 18 is a timing chart showing the timing signals used by the reproduction circuit shown in FIG. 17 in the normal mode. The operation of the reproduction circuit of this embodiment will now be described with reference to FIGS. 17 and 18.

As mentioned above, the basic configuration for obtaining an ATF error signal used for controlling tracking during reproduction alternately employs the reproduced signals of ch1 and ch3 synchronously with HSW 620. In addition to this, since the SW circuits 609 and 611 are provided in this embodiment, the reproduced signals of the overlap portions can also be applied to the BPF 614 synchronously with the rotation of the drum.

As shown in FIGS. 13 and 15, recording of the pilot signals in the overlap portions for the heads ch1 and ch3 is very effective for determining back locking. In this embodiment, determination of back locking is performed, i.e., the type of a main pilot signal is determined, without adversely affecting the detection of the pilot crosstalk signals in the main signal recording portion to operate the logic of the ATF error signal by reproducing the main signal recording portions by one head pair while reproducing the overlap recording portions by the other head pair. Consequently, a tracking controlled state can be obtained without delay. Further, the AGC circuit by the level of the main pilot signal is achieved.

This will be described in more detail below. When the HSW 620 shown in FIG. 18 is input to the SW circuits 610 and 612, the SW circuits 610 and 612 select the outputs of the heads which are currently tracking the main signal recording portions, and supply the selected outputs to the reproduced signal processing circuit 126.

The sampling pulse A621 is slightly leading the HSW 620, as shown in FIG. 18. Thus, the SW circuits 609 and 611 output the reproduced signals obtained from the time when the heads are tracing the entering side overlap recording portions to the time which is a predetermined period of time before the end of the tracing of the main signal recording portions. Thus, if the level of the sampling pulse C623 is fixed and if the SW circuit 613 is kept connected to the side of the SW circuit 609, the reproduced pilot signal components shown in FIG. 18 are contained in the reproduced signals output from the SW circuit 613, i.e., the single pilot component contained in the reproduced signal of the track on which reproduction is currently performed mainly is obtained from the entering side overlap recording portion, and the f1 and f2 pilot signal components contained in the reproduced signals from the two adjacent tracks of the track on which reproduction is currently performed mainly are obtained from the main signal recording portion.

The signal obtained by the SW circuit 613 is supplied to the detector/amplifier 617 through the BPF 614, the equalizer 615 and then the AGC circuit 616. The detector/amplifier 617 corresponds to a circuit portion shown in FIG. 7 which is made up of the BPFs 113 and 114, the detector circuits 115 and 116, the differential amplifier 117, the inverting amplifier 118 and the SW circuit 119 controlled by HSW. The output of the detector/amplifier 617 is used in two systems. The output of the detector/amplifier 617 obtained when the sampling pulse B622 is at a high level is an AGC control signal. That is, the AGC control signal is a control signal corresponding to the magnitude of the single pilot component in the entering side overlap recording portion, which is contained in the signal reproduced from the track on which reproduction is currently performed mainly. The AGC control signal shown in FIG. 18 is fed back to the AGC circuit 616.

The ATF circuit 624 sample/holds the output of the detector/amplifier 617 obtained when reproduction is performed on the main signal recording portion according to the sampling pulse B622, and extracts it as an ATF error signal. The output of the detector/amplifier 617 obtained when reproduction is performed on the overlap recording portion is utilized for back locking detection. When back locking is detected, the polarity of the ATF error signal is reversed to obtain a tracking controlled state.

As shown in FIGS. 13 and 15, although no pilot signal is superimposed on the recording signal in the overlap recording portions for the heads ch2 and ch4, pilot crosstalk can be obtained. This can be utilized to obtain an excellent tracking state for a head pair whose mounting accuracy is not good as in the case of, for example, a ch$1_1$ and ch$2_1$ head pair shown in FIG. 13. To achieve this, the CPU 618 operates a difference between the crosstalk of the main signal recording portion and the crosstalk of the overlap recording portion, and corrects the ATF error signal 625 generated by the ATF circuit 624 using the obtained difference. As a result, an excellent tracking state can be obtained as in the case of, for example, a ch$1_2$ and ch$2_2$ head pair shown in FIG. 13.

To achieve the above-described operation, the sampling pulse C623 is not fixed but is reversed for a predetermined period of time the reproduced signal from the entering side overlap recording portion is supplied to the SW circuit 613, while the sampling pulse 622B is set to the same logical level as that set when reproduction is performed on the main signal recording portion for the predetermined period of time. That is, the outputs of the heads ch2 and ch4 are supplied from the SW circuit 613 to the BPF 614 and the circuits subsequent thereto during that predetermined period of time. As shown in FIG. 13, the reproduced signals obtained during that predetermined period of time contain the f1 and f2 frequency components as the crosstalk components from the tracks located adjacent to the tracks the heads ch2 and ch4 are mainly tracing. ATF error signals for the heads ch2 and ch4 can be obtained by comparing these components. That is, the detector/amplifier circuit 617 is producing ATF error signals for the heads ch2 and ch4 during that predetermined period of time. The ATF circuit 624 extracts both the ATF error signals relating to the heads ch2 and ch4 and the ATF error signals for the main signal recording portions relating to the heads ch1 and ch3 using the sampling pulse 622B and averages these ATF error signals to achieve the most effective tracking control for all the heads.

Further, the reproduced signal is extracted using the sampling pulse 622B during the time when the head is tracking the entering side overlap recording portion except for that predetermined period of time, and the AGC control signal is formed in the manner described above using the extracted signal to improve the accuracy and stability of tracking. Further, back locking can be detected in the manner described above using the similarly extracted signal, and a stable tracking controlled state can thus be obtained by reversing the polarity of the ATF signal.

As will be understood from the foregoing description, in the second embodiment of the present invention, an AGC control signal for stabilizing the reproduction level of the reproduced pilot signal can be obtained using the pilot signal reproduced from the area other than the main signal recording area to stabilize tracking control. Further, even if back locking occurs, normal locking can be quickly obtained. Further, since a deviation of the position at which the head traces due to a deterioration in the head mounting accuracy is corrected by tracking control, excellent tracking scanning is enabled without the assembly cost being increased.

Now, a third embodiment of the present invention will be described.

Figure 19:
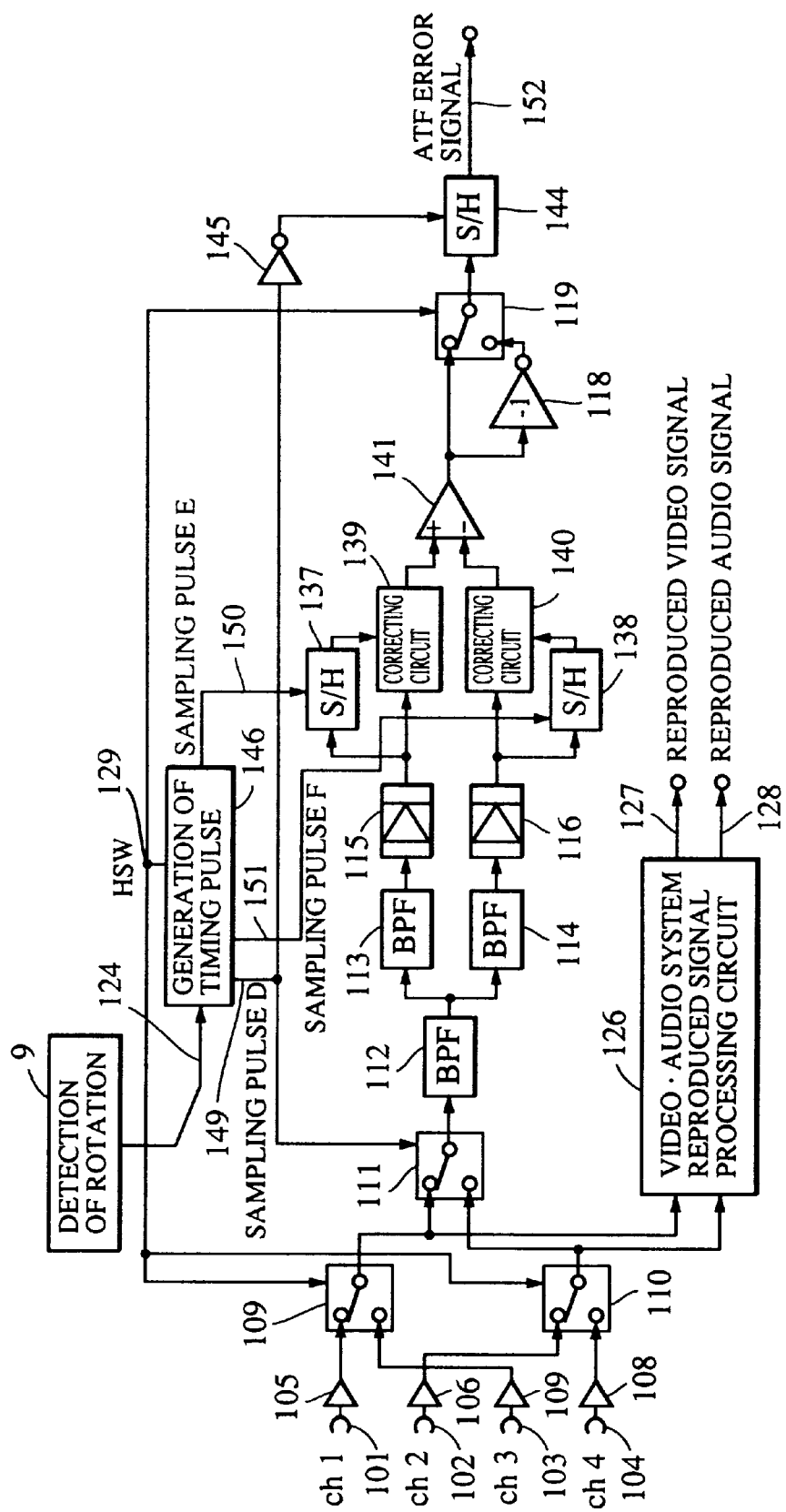
FIG. 19 illustrates the structure of a reproducing system circuit according to a third embodiment of the present invention.

FIG. 19 illustrates the reproduction system according to the third embodiment of the present invention. The recording system of the third embodiment has the same structure as that employed in the aforementioned first embodiment, a further description thereof being omitted. Identical reference numerals in FIG. 19 to those in FIG. 7 represent similar or identical elements, a further detailed description thereof being omitted.

In FIG. 19, reference numeral 137 denotes a S/H circuit for sample/holding the output signal of the detecting circuit 115. Reference numeral 138 denotes a S/H circuit for sample/holding the output signal of the detecting circuit 116. Reference numeral 139 denotes a correcting circuit for correcting the output signal of the detecting circuit 115 using the output of the S/H circuit 137. Reference numeral 140 denotes a correcting circuit for correcting the output signal of the detecting circuit 116 using the output of the S/H circuit 138. Reference numeral 141 denotes a differential amplifier whose two inputs are the corrected outputs of the correcting circuits 139 and 140. Reference numeral 118 denotes an inverting amplifier for reversing the output signal of the differential amplifier 140. Reference numeral 119 denotes a SW circuit for selecting either the output of the differential amplifier 141 or the output of the inverting amplifier 118. Reference numeral 144 denotes a S/H circuit for sample/holding the output signal of the SW circuit 119. Reference numeral 145 denotes an inverter circuit for reversing the sampling pulse D149 and for applying the reversed pulse to the S/H circuit 144.

Reference numeral 146 denotes a timing pulse generating circuit for generating, from the drum rotation detection signal 124 (drum PG), various timing signals, such as a head SW pulse (HSW) 129, a sampling pulse D149, a sampling pulse E150 and a sampling pulse F151. Reference numeral 149 denotes a sampling pulse D applied to the SW circuit 111 and the inverter circuit 145 to temporarily select the heads ch2 and ch4 which cannot detect the ATF error signal synchronously with the rotation of the drum. Reference numeral 150 denotes a sampling pulse E for making the S/H circuit 137 sample/hold the output of the detecting circuit 115. Reference numeral 151 denotes a sampling pulse F for making the S/H circuit 138 sample/hold the output of the detecting circuit 116. Reference numeral 152 denotes an ATF error signal used to perform tracking control by controlling the rotational speed of the capstan.

Figure 20:
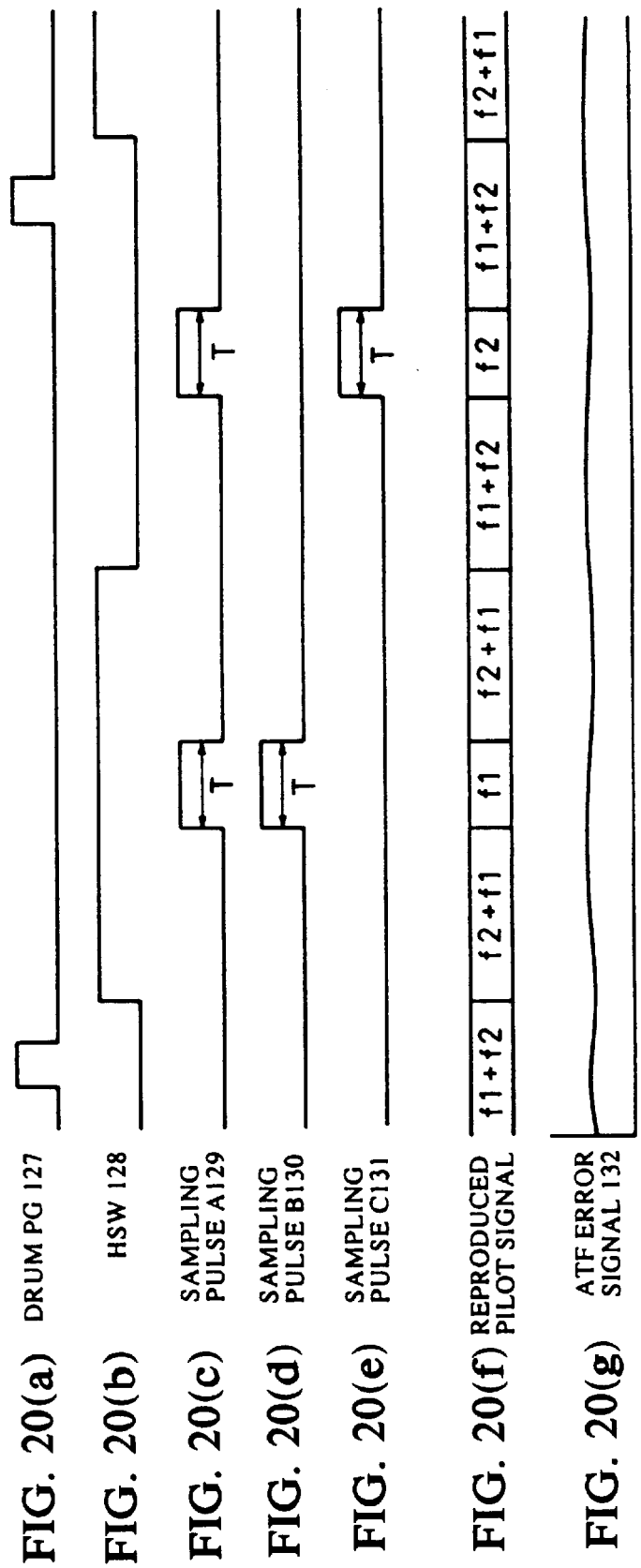
FIGS. 20(a)–(g) are timing charts of signals used in the reproducing circuit shown in FIG. 19 in the normal reproduction mode.

FIG. 20 is a timing chart of the signals employed in the normal reproduction mode of the embodiment shown in FIG. 19. The circuit operation of the third embodiment will now be described with reference to FIGS. 19 and 20.

In this embodiment, the crosstalk (pilot crosstalks) used to detect an ATF error cannot be obtained from the ch2 and ch4 heads 102 and 104, as in the case of the first embodiment. However, the pilot signals, which are superimposed on the main tracks for the ch2 and ch4 heads 102 and 104, are very effective to evaluate the level of the reproduced pilot signals.

The present embodiment utilizes this knowledge to achieve detection of a stable ATF error signal. That is, the S/H circuits 137 and 138 are provided, and the correcting circuits 139 and 140 are designed to correct the f1 and f2 components of the crosstalk obtained by the ch1 and ch3 heads to detect an ATF error using the f1 and f2 components of the pilot signals reproduced by the ch2 and ch4 heads.

Figure 21:
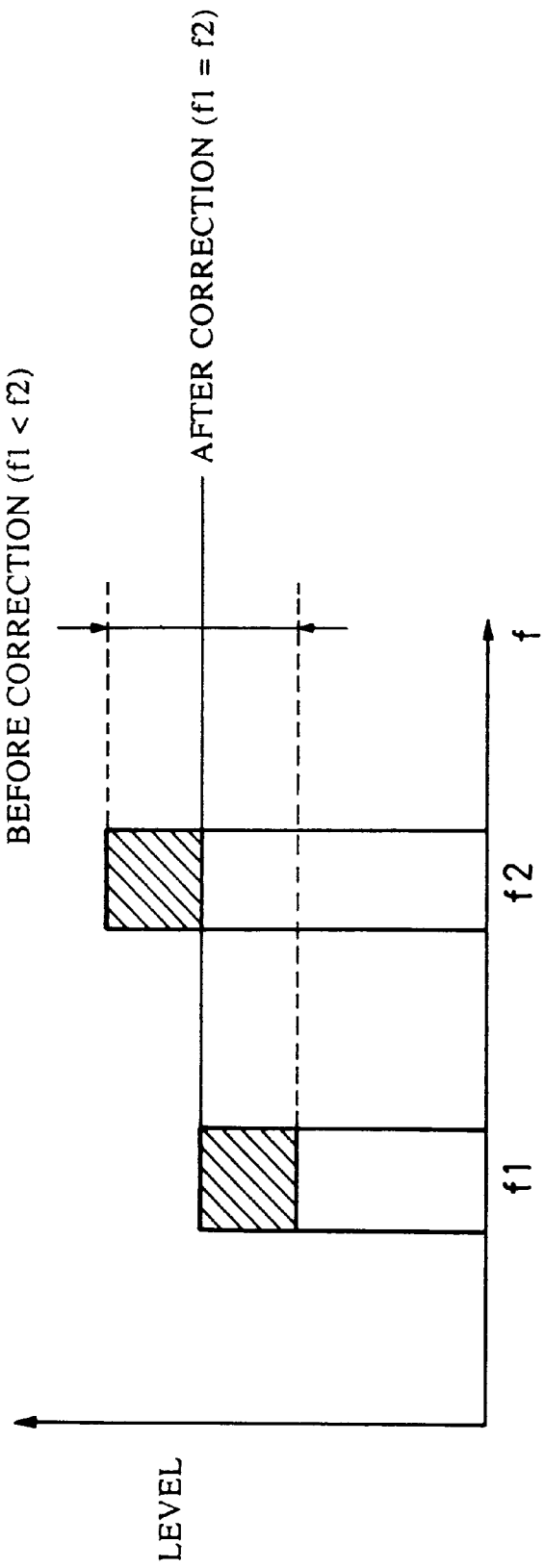
FIG. 21 shows the reproduction levels of reproduced pilot signals.

FIG. 21 illustrates the frequency characteristics of the reproduced signal obtained when the reproduction level of the f2 component reproduced by the ch4 head is higher than the reproduction level of the f1 component reproduced by the ch2 head. As can be seen from FIG. 21, when no correction is made, a higher f2 component of the crosstalk than the f1 component is detected even in an excellent tracking state, thus cancelling the tracking controlled state. In this embodiment, the f1 and f2 components of the crosstalk are brought into coincidence in an excellent tracking state by increasing the f1 component relative to the f2 component, as shown by the hatched portions in FIG. 21, and an excellent tracking state can thus be maintained.

In this embodiment, the four-head type VTR employing two head pairs has been described. However, the present embodiment can be applied to any two-head pair recording or reproducing apparatus which employs the tracking error detection method in which no pilot signal is superimposed on the main signals at every N tracks.

A/D converters may be used in place of the sample/holding circuits shown in this embodiment.

Even if the reproduction level varies within the same track, excellent tracking control can be achieved by performing correction using the reproduction level of the adjacent tracks for detecting an ATF error at an arbitrary phase synchronized with the rotation of the drum.

As will be understood from the foregoing description, since the level of the pilot signal contained in the reproduced signal of the head which reproduces the track on which no pilot signal is recorded is corrected using the level of the pilot signal contained in the reproduced signal of the head which reproduces the track on which the pilot signal is recorded, even when there is a difference in the level between f1 and f2 due to the reproduction frequency characteristics or even if the reproduction level of the pilot signal varies, the same effect as that obtained by performing equalizing or gain control can be obtained, and excellent tracking control can thus be always performed.

A fourth embodiment of the present invention will now be described.

Figure 22:
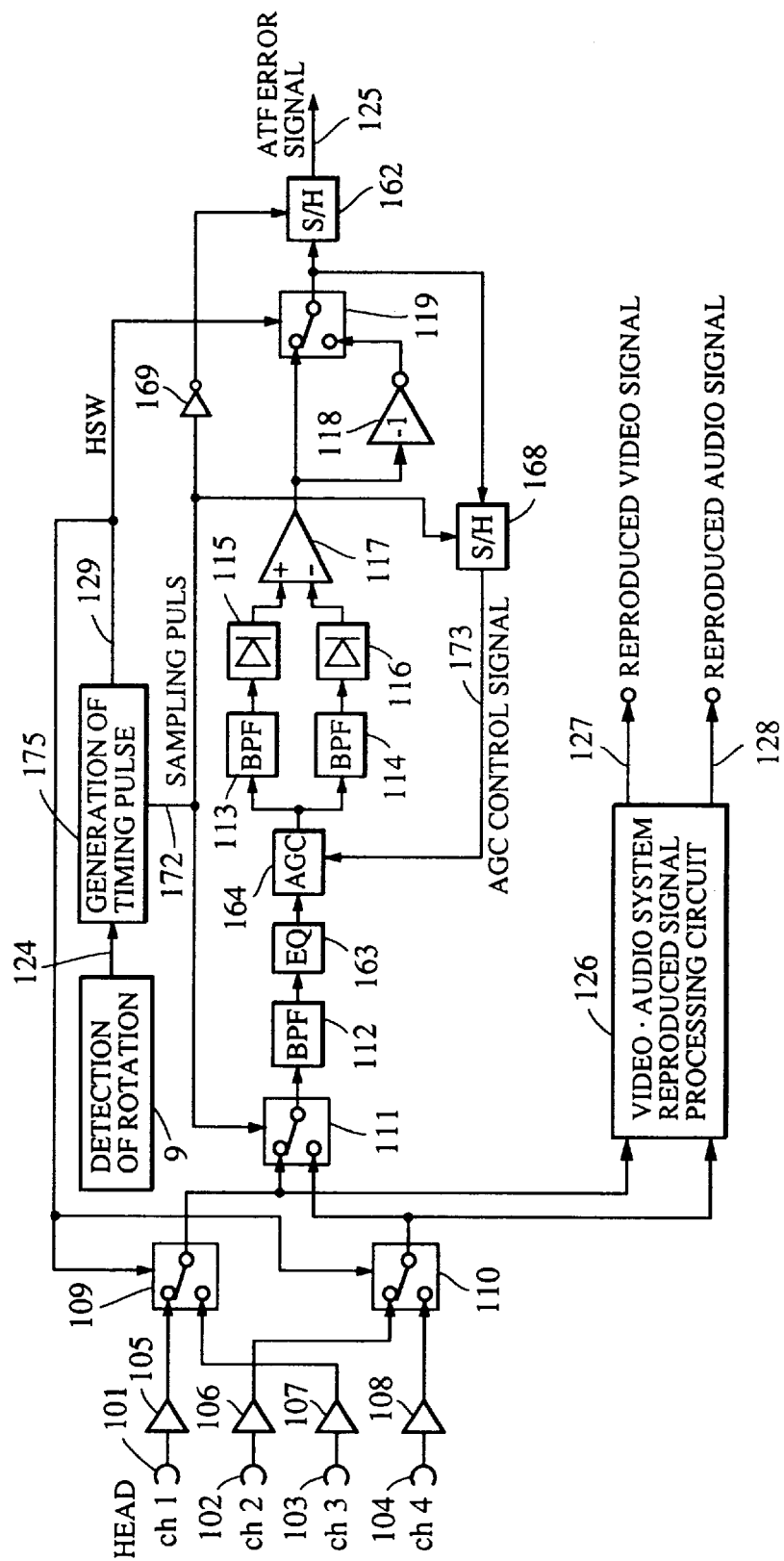
FIG. 22 illustrates the structure of a reproducing system circuit according to a fourth embodiment of the present invention.

FIG. 22 illustrates the structure of a reproducing system according to the fourth embodiment of the present invention. The structure of a recording system of the fourth embodiment is exactly the same as that of the first embodiment, a further description thereof being omitted. In FIG. 22, identical reference numerals to those in FIG. 7 represent similar or identical elements.

Reference numeral 112 denotes a band-pass filter (BPF) for extracting the frequency band of the pilot signal from the reproduced signal selected by the SW circuit 111. Reference numeral 163 denotes an equalizer having characteristics reversed from the reproduction characteristics of dø/dt in order to correct the reproduction gain of the extracted reproduction pilot signal. Reference numeral 164 denotes an AGC circuit for correcting variations in the level of the reproduction pilot signal caused by the characteristics of the tape or variations in the recording current. Reference numeral 162 denotes a S/H circuit for sample/holding the output signal of the SW circuit 119. Reference numeral 168 denotes a S/H circuit for sample/holding the output signal of the SW circuit 119 by means of a sampling pulse 172 which will be described later. Reference numeral 169 denotes an inverter circuit for inverting the sampling pulse 172 and for applying the inverted pulse to the S/H circuit 172. Reference numeral 175 denotes a timing pulse generating circuit for generating, from a drum rotation detection signal 124 (drum PG), various timing signals including a head SW pulse 129 (HSW) and the sampling pulse 172.

Reference numeral 172 denotes a sampling pulse for temporarily selecting ch2 and ch4 heads which cannot detect an ATF error synchronously with the rotation of the drum. Reference numeral 173 denotes an AGC control signal for controlling the gain of the AGC amplifier 164 to control the level of the reproduction level to an adequate level. The AGC control signal is a signal obtained by sample/holding the output of the differential amplifier 119 obtained during the period of the sampling pulse 172 by that pulse.

FIG. 23 is a timing chart of the signals employed in the normal reproduction mode in the embodiment shown in FIG. 22. The operation of the circuit of the fourth embodiment will be described below with reference to FIGS. 22 and 23.

In this embodiment, it is impossible to obtain the crosstalk (pilot crosstalks) for detecting an ATF error signal from ch2 and ch4 heads 102 and 104. However, the pilot signals, which are superimposed on the main signals in the main tracks for ch2 and ch4 heads 102 and 104, are very useful to evaluate the level of the reproduction pilot signals using those pilot signals, as in the case of the third embodiment.

In this embodiment, since the S/H circuits 162 and 168 are provided and the S/H circuits 162 and 168 are made to operate at opposite timings by the inverter 169, the AGC circuit can be controlled by the pilot signals reproduced from ch2 and ch4 heads without the detection of the ATF error signal being adversely affected.

Further, since the equalizer 163 is provided in order to correct a difference in the level between a plurality of pilot signals due to the reproduction frequency characteristics, the pilot level can be further stabilized.

Figure 24A:
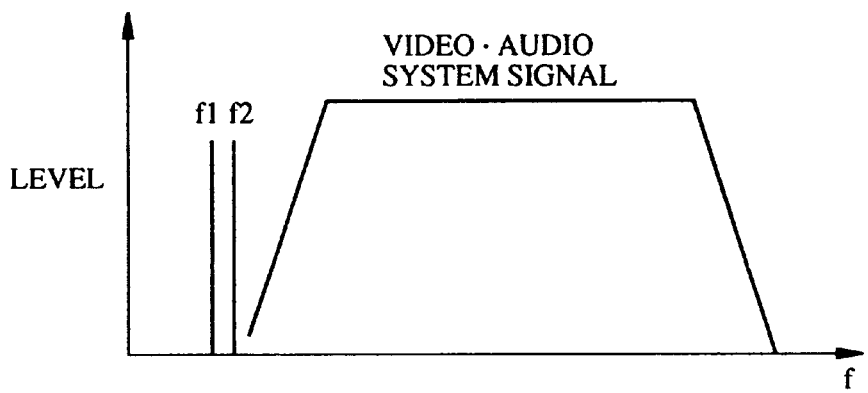
FIGS. 24(a) and 24(b) illustrate the operation of an equalizer circuit in the circuit shown in FIG. 22.
Figure 24B:
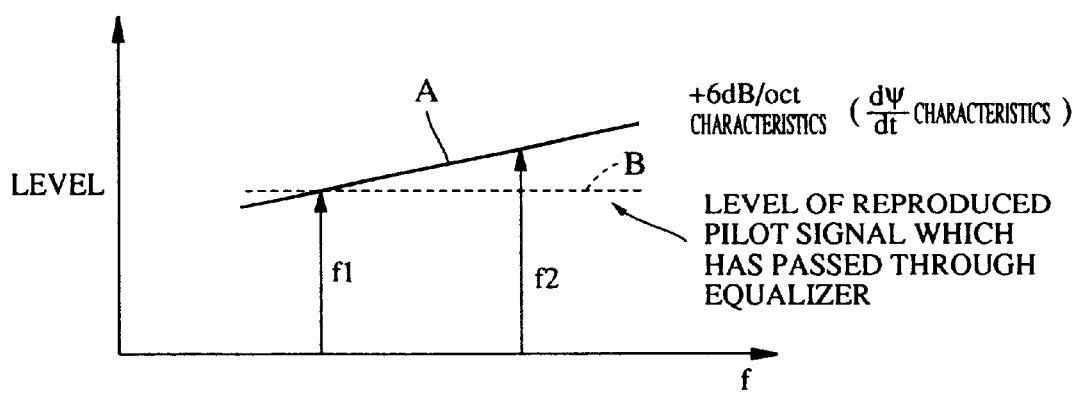

FIG. 24(a) is an illustration of a frequency spectrum of f1 and f2 pilot signals and a video•audio signal which is the main signal. FIG. 24(b) is a graphic representation of a characteristic A in which (the reproduction level of f1)<(the reproduction level of f2) due to the reproduction characteristic of dø/dt when f1<f2, and of a characteristic B representing the level of the reproduced pilot signals whose frequency characteristics have been corrected by the equalizer 163.

In this embodiment, since the gain of the pilot signal contained in the reproduced signal is controlled by the level of the pilot signal contained in the reproduced signal of the head which reproduces the track on which the pilot signal is recorded, even when there is a difference in the level between f1 and f2 due to the reproduction frequency characteristics or even when the reproduction level of the pilot signal varies, the same pilot detector circuit can be used to obtain a tracking error signal, and the gain control signal for controlling the AGC circuit for stabilizing the reproduction level of the reproduced pilot signal can be obtained. Consequently, excellent tracking control can be performed.

In the above-described embodiments, although the pilot signal components are analogously detected to form or correct the ATF error signal, they may also be detected digitally. Further, a digital circuit network may be used to obtain a signal for correction.

The individual components shown in outline or designated by blocks in the Drawings are all well-known in the signal recording/reproducing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information signal reproducing apparatus for reproducing information signals from a recording medium on which first and second pilot signal components having different predetermined frequencies are superimposed on the information signals such that the first and second pilot signal components are alternately superimposed, and no pilot signal component is superimposed at every other track of a plurality of parallel tracks of the recording medium, said apparatus comprising:

head means for tracing the recording medium to reproduce the information signal and the pilot signal components, said head means including a plurality of heads;

formation means for forming a tracking error signal, which indicates an extent and a direction of the tracking error of said head means, by using the pilot signal components included in a first reproduced signal reproduced by said head means tracing a first track in which said pilot signal components are not superimposed on the information signal;

tracking control means for controlling a position of said head means relative to the tracks by using the tracking error signal, said tracking control means making said head means trace a target track; and;

shifting means for shifting the target tracks by two tracks by using the pilot signal component included in a second reproduced signal reproduced by said head means tracing a second track next to the first track, the pilot signal component being superimposed on the second track.

2. An apparatus according to claim 1, wherein the reproduced pilot signal component used by said shifting means for shifting the target track comprises a pilot signal component recorded in the second track next to the first track, and wherein the first and second tracks are concurrently traced by said head means.

3. An apparatus according to claim 1, wherein said head means includes first and second heads for tracing said recording medium, and wherein said shifting means uses the pilot signal component reproduced by said second head to modify the tracking error signal formed by said formation means according to pilot signal crosstalk in the information signal reproduced by said first head.

4. An apparatus according to claim 3, wherein said first and second heads are arranged to concurrently trace two adjoining tracks.

5. An apparatus according to claim 1, wherein said shifting means includes means for inverting a polarity of said tracking error signal.

6. An information signal reproducing apparatus for reproducing information signals from a recording medium in which first and second pilot signal components having different predetermined frequencies are superimposed on the information signals such that the first and second pilot signal components are alternately superimposed, and no pilot signal component is superimposed at every other track of a plurality of parallel tracks of the recording medium, said apparatus comprising:

head means for tracing said recording medium to reproduce the information and the pilot signal components, said head means including first and second heads, two recording medium tracks which are next to each other being traced by said first and second heads;

formation means for forming a tracking error signal, which indicates an extent and a direction of the tracking error of said head means, by using the pilot signal components included in a first reproduced signal reproduced by said first head;

tracking control means for controlling a position of said head means relative to the tracks by using the tracking error signal, said tracking control means making said head means trace a target track; and;

shifting means for shifting the target track by two tracks by using a pilot signal component included in a second reproduced signal reproduced by said second head.

7. An apparatus according to claim 6, wherein said first and second heads concurrently trace the two tracks next to each other.

8. An apparatus according to claim 6, further comprising switching means for selectively inputting the outputs of said first and second heads to said formation means, and wherein said shifting means shifts the target track by using the output of said formation means when the output of said second head is input to said formation means by said switching means.

* * * * *

UNITED STATES PATENT AND TRADEMARK OFFICE
CERTIFICATE OF CORRECTION

PATENT NO. : 6,005,741

DATED : December 21, 1999

INVENTOR(S) : NOBUTOSHI TAKAYAMA, ET AL.

It is certified that error appears in the above-identified patent and that said Letters Patent is hereby corrected as shown below:

COLUMN 1
  Line 24, "s" should read --a--.

COLUMN 11
  Line 6, "a" should read --an--.

COLUMN 12
  Line 35, "flowchart" should read --flowchart--.

Signed and Sealed this

Thirteenth Day of February, 2001

Attest:

NICHOLAS P. GODICI

*Attesting Officer*      *Acting Director of the United States Patent and Trademark Office*